(12) United States Patent
Huang et al.

(10) Patent No.: US 10,716,066 B2
(45) Date of Patent: Jul. 14, 2020

(54) METHODS TO ALLOCATE TARGET WAKE TIME (TWT) SERVICE PERIODS IN ACCORDANCE WITH A TEMPORARY PRIMARY CHANNEL

(71) Applicant: Intel IP Corporation, Santa Clara, CA (US)

(72) Inventors: Po-Kai Huang, San Jose, CA (US); Laurent Cariou, Portland, OR (US); Yaron Alpert, Hod Hasharoni (IL); Arik Klein, Givaat Shmuel (IL); Daniel F. Bravo, Hillsboro, OR (US); Daniel Leiderman, Ra'anana (IL); Amir Hitron, Beit Ytzhak (IL); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/270,746

(22) Filed: Feb. 8, 2019

(65) Prior Publication Data
US 2019/0246354 A1    Aug. 8, 2019

Related U.S. Application Data

(60) Provisional application No. 62/627,876, filed on Feb. 8, 2018, provisional application No. 62/629,963, filed on Feb. 13, 2018, provisional application No. 62/635,034, filed on Feb. 26, 2018.

(51) Int. Cl.
*H04W 52/02* (2009.01)
*H04W 84/12* (2009.01)

(52) U.S. Cl.
CPC ... *H04W 52/0229* (2013.01); *H04W 52/0216* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2016/0135199 A1* | 5/2016 | Wang | | H04W 74/0816 |
| | | | | 455/450 |
| 2016/0249383 A1* | 8/2016 | Kwon | | H04W 52/0216 |
| 2018/0132178 A1* | 5/2018 | Park | | H04W 52/0216 |

* cited by examiner

*Primary Examiner* — Anh Ngoc M Nguyen
(74) *Attorney, Agent, or Firm* — Schwegman Lundberg & Woessner, P.A.

(57) ABSTRACT

Embodiments of a high efficiency subchannel selective transmission (HE SST) access point (AP) and an HE SST station (STA) are generally described herein. The HE SST AP may determine a temporary primary channel for an HE SST STA. The HE SST AP may communicate with the HE SST STA in a plurality of channels that includes the temporary primary channel and further includes a primary channel. The HE SST AP may determine trigger-enabled target wake time service periods (TWT SPs) for exchange of frames between the HE SST AP and the HE SST STA on the temporary primary channel. The trigger-enabled TWT SPs may be determined to not overlap with target beacon transmission times (TBTTs) at which beacon frames that include delivery traffic indication maps (DTIMs) are to be sent on the primary channel by the HE SST AP.

21 Claims, 17 Drawing Sheets

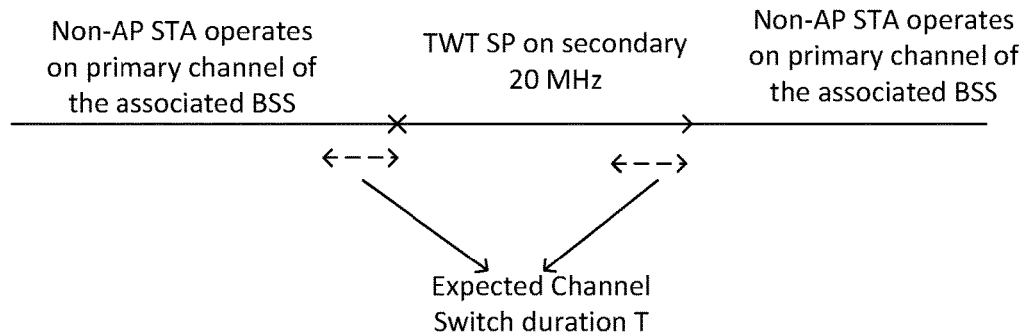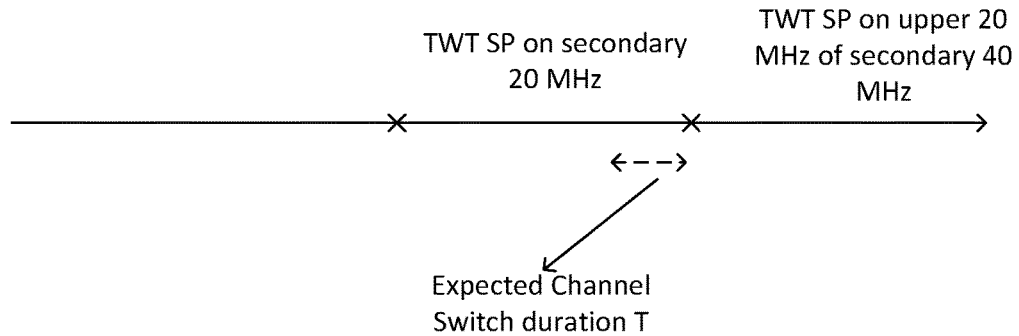
FIG. 10

1100

| Element ID | Length | Control | Request Type | Target Wake Time | TWT Group Assignment | Nominal Minimum TWT Wake Duration | TWT Wake Interval Mantissa | TWT Channel | NDP Paging (optional) |
|---|---|---|---|---|---|---|---|---|---|
| Octets: 1 | 1 | 1 | 2 | 8 or 0 | 9 or 3 or 0 | 1 | 2 | 1 | 0 or 4 |

TWT element format

FIG. 11

1200
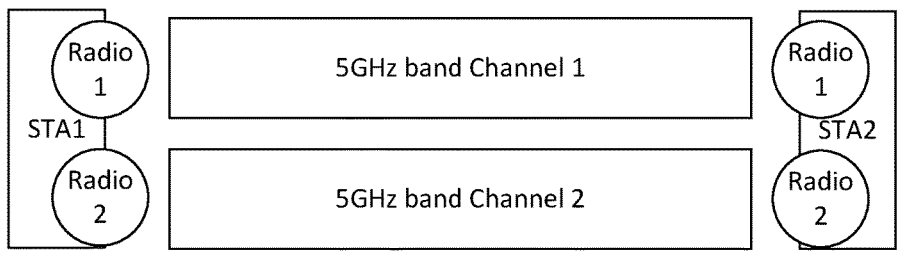
1230
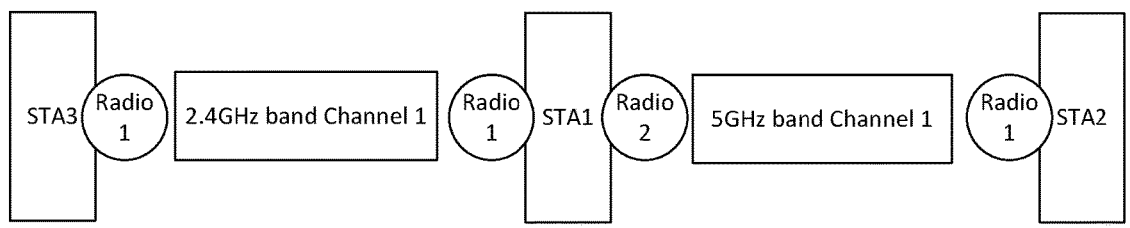
1260
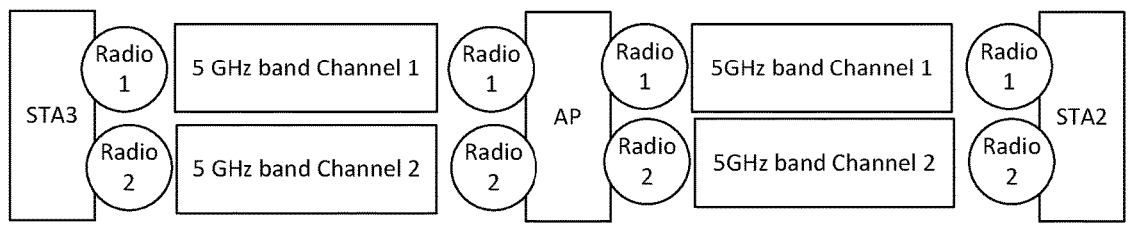
FIG. 12

1400

1500

1600

| Element ID | Length | Element ID Extension | Potential Existence of other fields | Interference of band/radio i on band/radio j | Interference property of band/radio i on band/radio j | Potential Existence of other fields |
|---|---|---|---|---|---|---|

1630

| Element ID | Length | Element ID Extension | Instruction of indicated rule | Duration of the instruction of the Indication |
|---|---|---|---|---|

1660

| Element ID | Length | Element ID Extension | Instruction of indicated rule | Starting time for the indication | Duration of the indication | Interval of the indication | Operating class indication | Channel number indication |
|---|---|---|---|---|---|---|---|---|

METHODS TO ALLOCATE TARGET WAKE TIME (TWT) SERVICE PERIODS IN ACCORDANCE WITH A TEMPORARY PRIMARY CHANNEL

PRIORITY CLAIM

This application claims priority under 35 USC 119(e) to U.S. Provisional Patent Application Ser. No. 62/627,876, filed Feb. 8, 2018, and to U.S. Provisional Patent Application Ser. No. 62/629,963, filed Feb. 13, 2018, and to U.S. Provisional Patent Application Ser. No. 62/635,034, filed Feb. 26, 2018, all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for allocation of target wake time (TWT) service periods in accordance with a temporary primary channel.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 10 illustrates examples of channel switch behavior in accordance with some embodiments;

FIG. 11 illustrates an example target wake time (TWT) element format in accordance with some embodiments;

FIG. 12 illustrates example scenarios in accordance with some embodiments;

FIG. 16 illustrates example elements in accordance with some embodiments.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
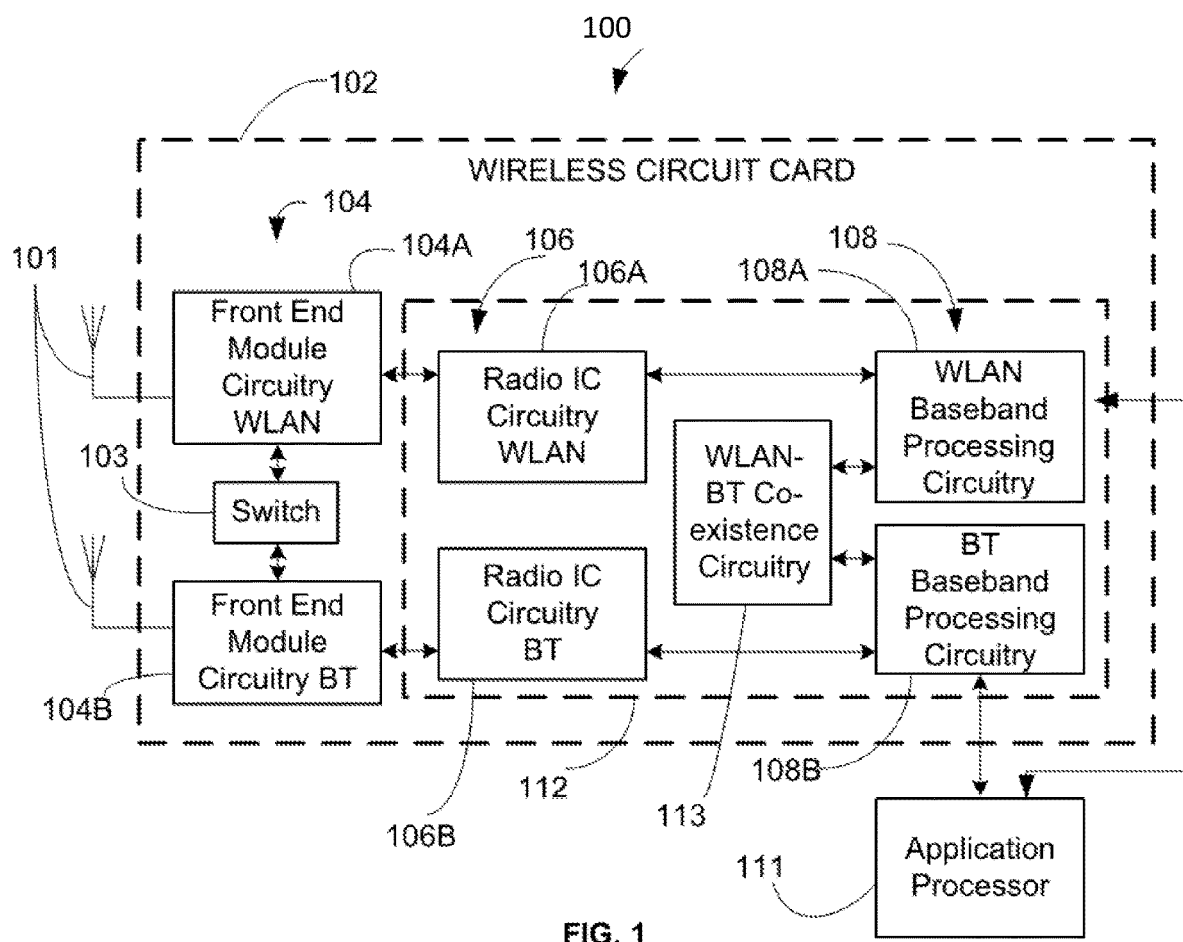
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
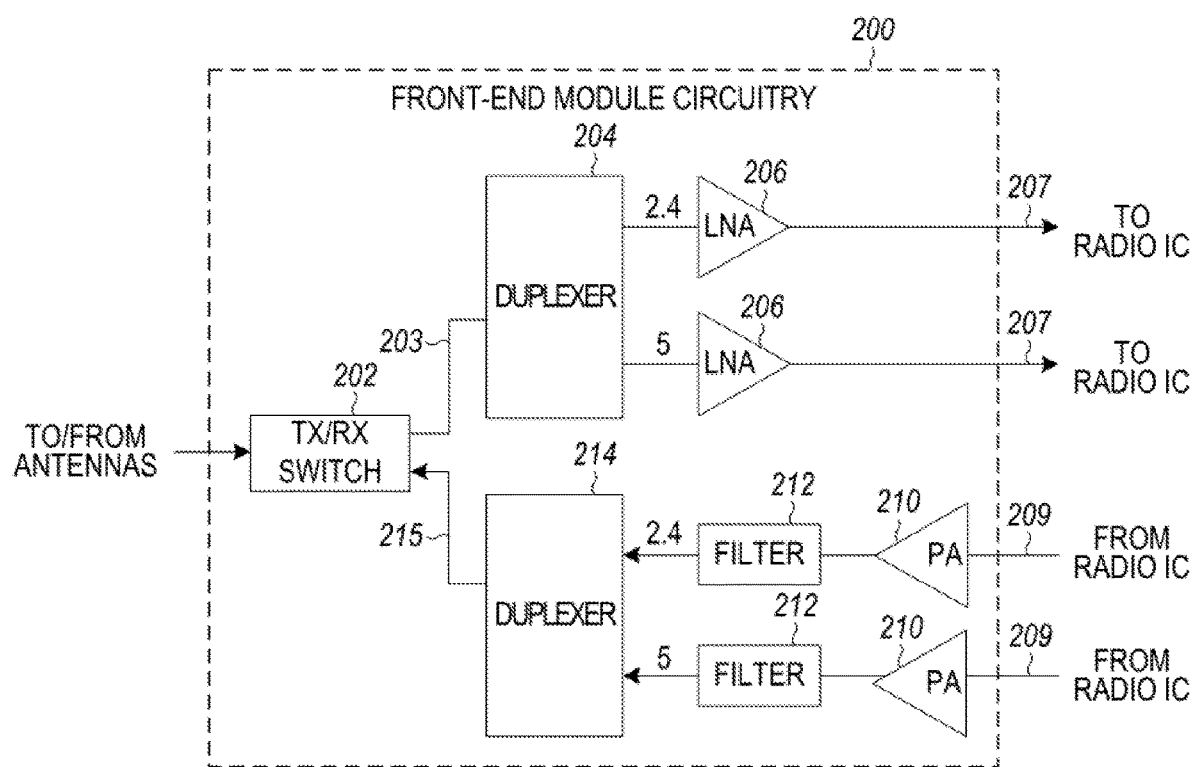
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
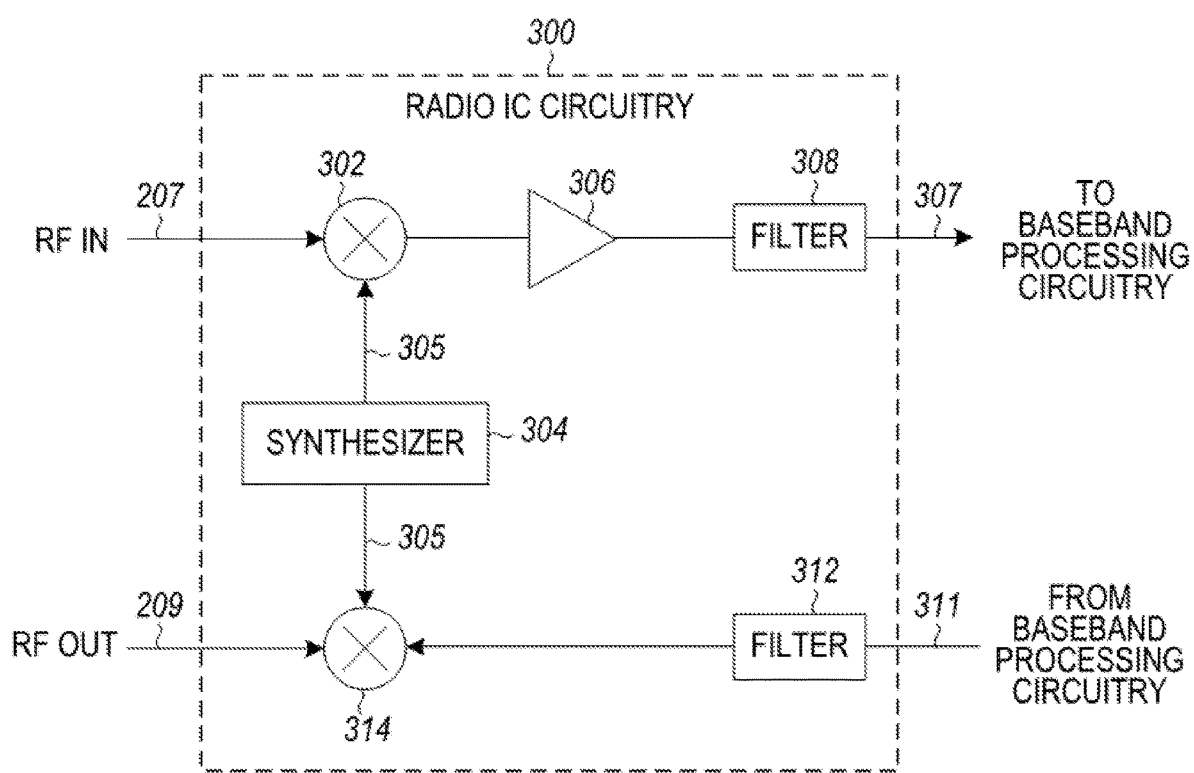
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
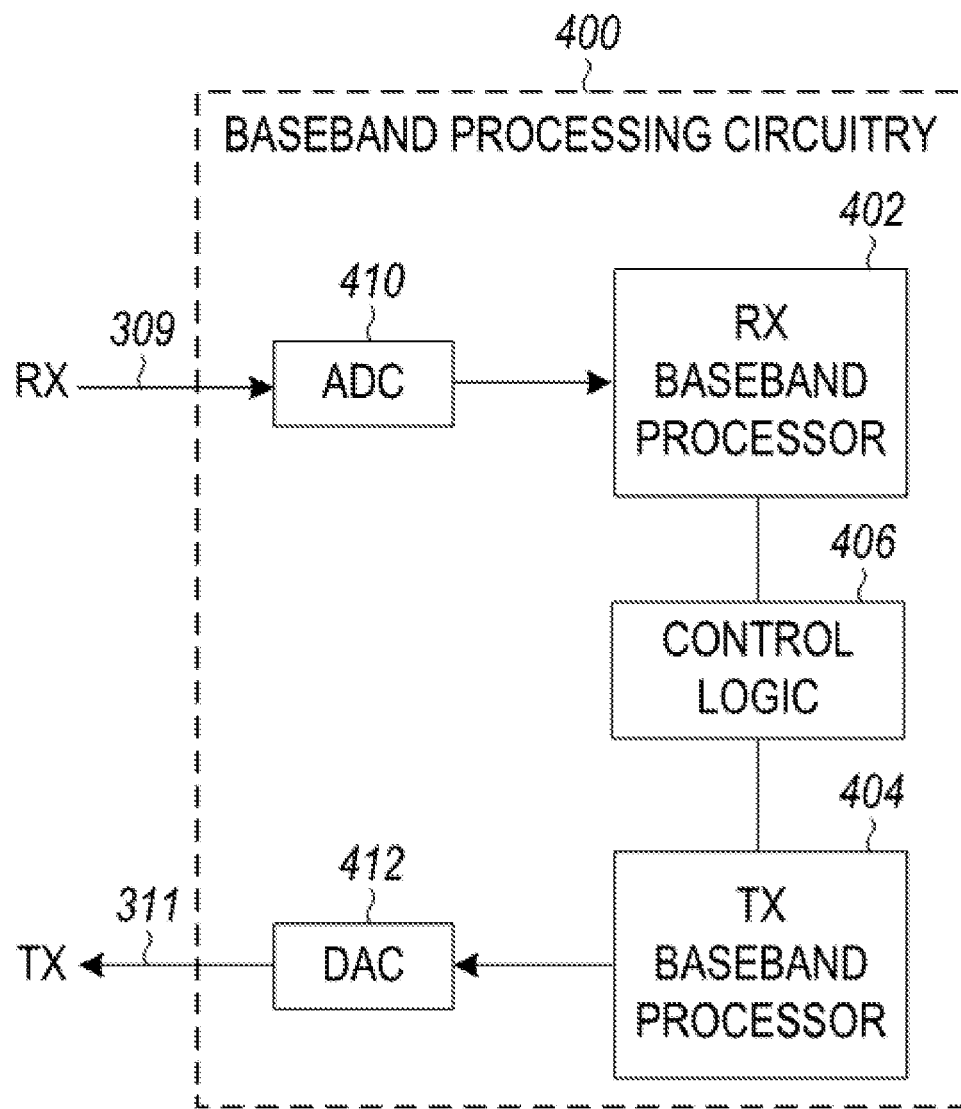
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
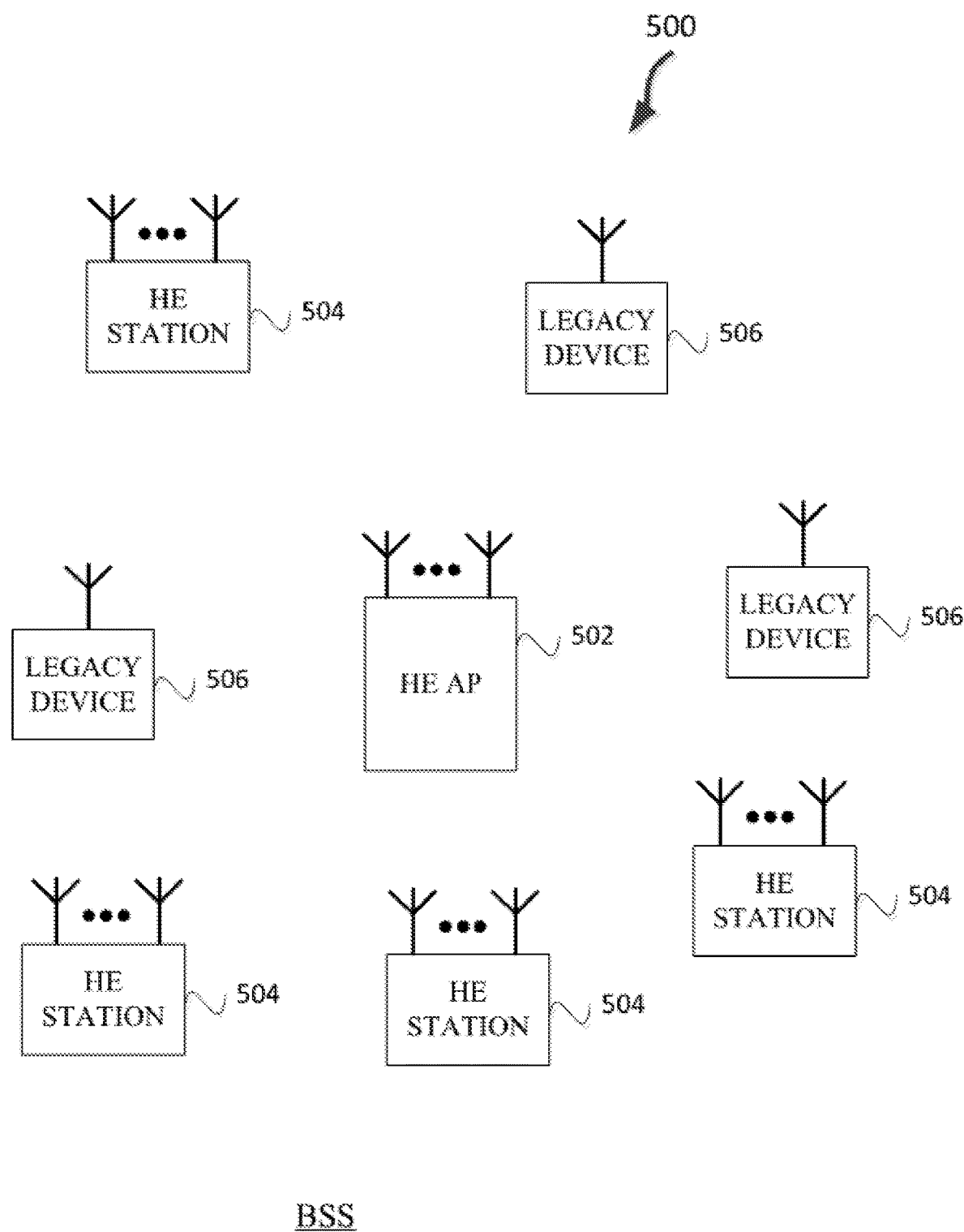
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-17.

In example embodiments, the HE station 504 and/or the HE AP 502 are configured to perform the methods and operations/functions described herein in conjunction with FIGS. 1-17. In example embodiments, an apparatus of the HE station 504 and/or an apparatus of the HE AP 502 are configured to perform the methods and functions described herein in conjunction with FIGS. 1-17. The term Wi-Fi may refer to one or more of the IEEE 802.11 communication standards. AP and STA may refer to HE access point 502 and/or HE station 504 as well as legacy devices 506.

In some embodiments, the HE AP 502 may be a high efficiency selective subchannel transmission AP (HE SST AP) 502. In some embodiments, the HE AP 502 may be configured to operate as an HE SST AP 502. In some embodiments, the HE STA 504 may be a high efficiency selective subchannel transmission STA (HE SST STA) 504. In some embodiments, the HE STA 504 may be configured to operate as an HE SST STA 504.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
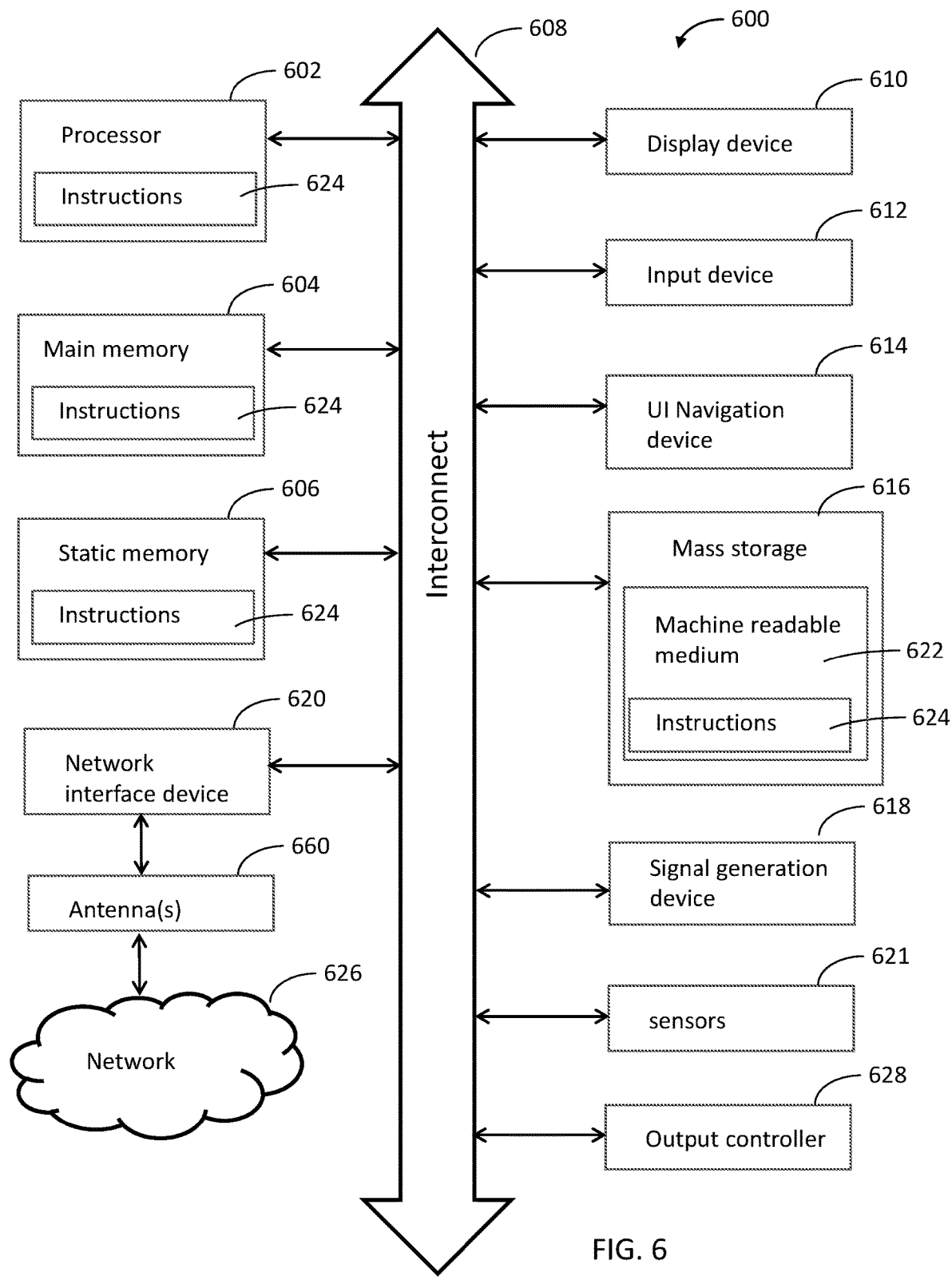
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
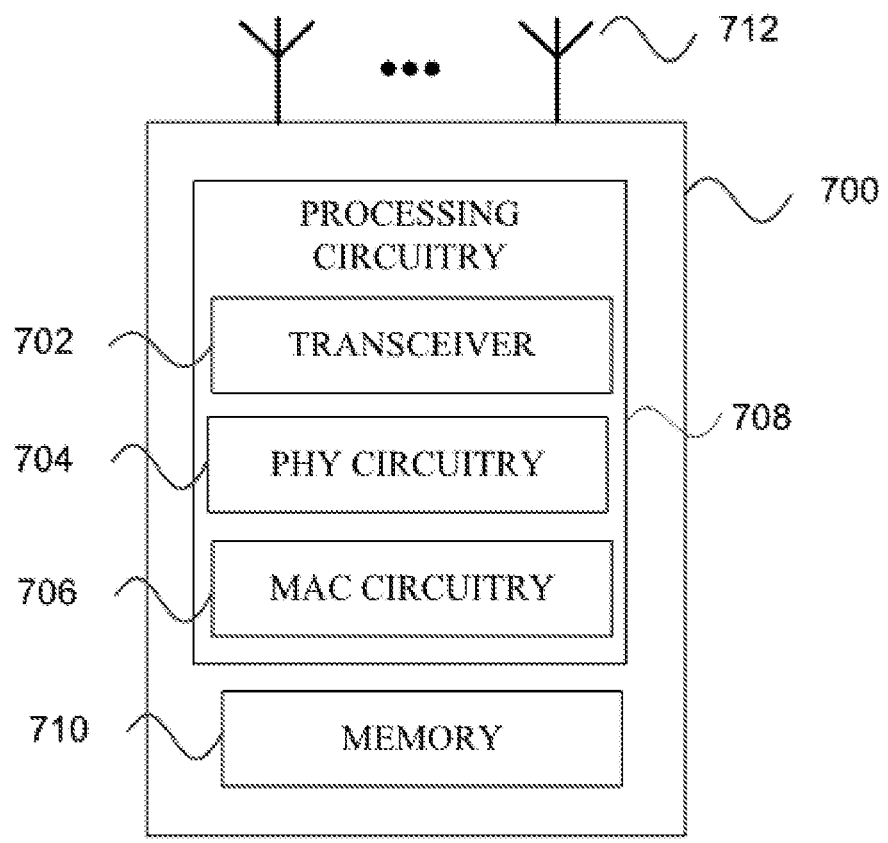
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

In accordance with some embodiments, a high efficiency subchannel selective transmission (HE SST) access point (AP) 502 may determine a temporary primary channel for an HE SST station (STA) 504. The HE SST AP 502 may communicate with the HE SST STA 504 in a plurality of channels that includes the temporary primary channel and further includes a primary channel. The HE SST AP 502 may determine trigger-enabled target wake time service periods (TWT SPs) for exchange of frames between the HE SST AP 502 and the HE SST STA 504 on the temporary primary channel. The trigger-enabled TWT SPs may be determined based on a restriction that the trigger-enabled TWT SPs do not overlap with target beacon transmission times (TBTTs) at which beacon frames that include delivery traffic indication maps (DTIMs) are to be sent on the primary channel by the HE SST AP 502. These embodiments are described in more detail below.

Figure 8:
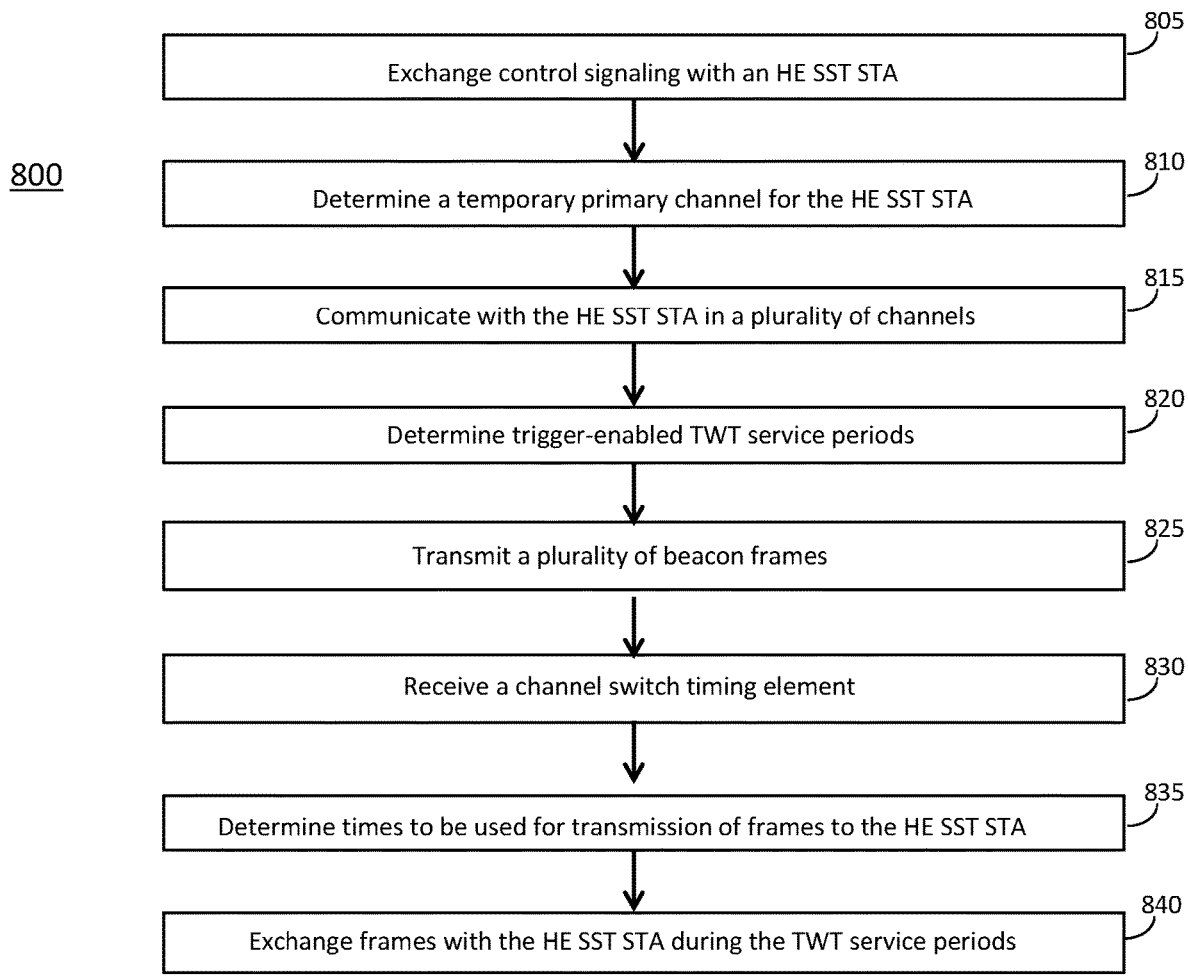
FIG. 8 illustrates the operation of a method in accordance with some embodiments.
Figure 9:
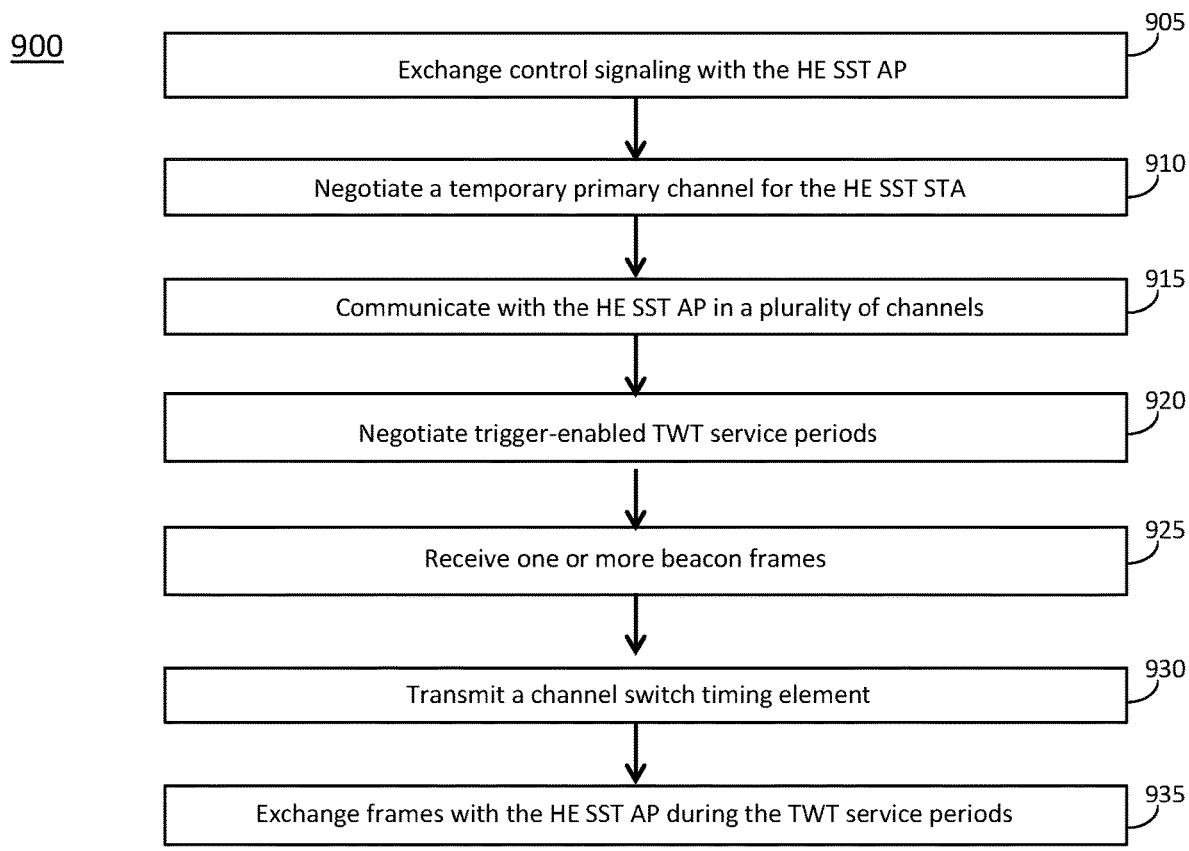
FIG. 9 illustrates the operation of another method in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, an HE AP 502 and/or an HE SST AP 502 may perform one or more operations of the method 800, but embodiments are not limited to performance of the method 800 and/or operations of it by the HE AP 502 or an HE SST AP 502. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the HE STA 504 or an HE SST STA 504 may perform an operation that may be the same as, similar to, reciprocal to and/or related to an operation of the method 800, in some embodiments.

In some embodiments, an HE STA 504 and/or an HE SST STA 504 may perform one or more operations of the method 900, but embodiments are not limited to performance of the method 900 and/or operations of it by the HE STA 504 and/or an HE SST STA 504. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the HE AP 502 and/or an HE SST AP 502 may perform an operation that may be the same as, similar to, reciprocal to and/or related to an operation of the method 900, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include transmission of an element (such as a frame, block, message and/or other) by the HE SST AP 502, and an operation of the method 900 may include reception of a same element (and/or similar element) by the HE SST STA 504. In some cases, descriptions of operations and techniques described as part of one of the methods 800, 900 may be relevant to the other method. Discussion of various techniques and concepts regarding one of the methods 800, 900 and/or other method may be applicable to one of the other methods, although the scope of embodiments is not limited in this respect.

The methods 800, 900 and other methods described herein may refer to HE SST APs 502, HE APs 502, HE SST STAs 504, HE STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the methods 800, 900 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the methods 800, 900 may also be applicable to an apparatus of an HE SST AP 502, an apparatus of an HE AP 502, an apparatus of an HE SST STA 504, an apparatus of an HE STA 504 and/or an apparatus of another device. In some embodiments, an apparatus of an HE AP 502 may perform one or more operations of the method 800 and/or other operations. In some embodiments, an apparatus of an HE SST AP 502 may perform one or more operations of the method 800 and/or other operations. In some embodiments, an apparatus of an HE STA 504 may perform one or more operations of the method 900 and/or other operations. In some embodiments, an apparatus of an HE SST STA 504 may perform one or more operations of the method 900 and/or other operations.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, IEEE 802.11ax and/or other. The scope of embodiments is not limited to usage of those elements, however. In some embodiments, different elements, similar elements, alternate elements and/or other elements may be used. The scope of embodiments is also not limited to usage of elements that are included in standards.

In some embodiments, the HE SST AP 502 may be arranged to operate in accordance with a high-efficiency (HE) wireless local area network (WLAN) protocol. In some embodiments, the HE SST STA 504 may be arranged to operate in accordance with an HE WLAN protocol.

At operation 805, the HE SST AP 502 may exchange control signaling with an HE SST STA 504. In some embodiments, the control signaling may include and/or indicate information related to the operations described herein. In some embodiments, the control signaling may include and/or indicate additional information. In some embodiments, the control signaling may include multiple elements, multiple frames, multiple messages and/or other. For instance, the HE SST AP 502 may transmit a first element that includes first information and may transmit a second element that includes second information. In some embodiments, the HE SST AP 502 may perform one or more operations that begin after transmission of the first element and before transmission of the second element.

At operation 810, the HE SST AP 502 may determine a temporary primary channel for the HE SST STA 504. In some embodiments, the HE SST AP 502 may negotiate the temporary primary channel for the HE SST STA 504. In some embodiments, the HE SST AP 502 may negotiate with the HE SST STA 504 to determine the temporary primary channel for the HE SST STA 504. In some embodiments, the HE SST AP 502 may transmit control signaling to the HE SST STA 504 that indicates the temporary primary channel.

At operation 815, the HE SST AP 502 may communicate with the HE SST STA 504. In some embodiments, the HE SST AP 502 may communicate with the HE SST STA 504 in a plurality of channels. In some embodiments, the plurality of channels may include the temporary primary channel and may further include a primary channel.

In some embodiments, the channels of the plurality of channels may be of bandwidth equal to 20 MHz. Embodiments are not limited to the bandwidth of 20 MHz, as other bandwidths may be used, in some embodiments. In some embodiments, the HE SST AP 502 may support communication in bandwidths such as 20 MHz, 80 MHz and/or other.

At operation 820, the HE SST AP 502 may determine trigger-enabled target wake time (TWT) service periods (SPs). In some embodiments, the HE SST AP 502 may negotiate the TWT SPs for the HE SST STA 504. In some embodiments, the HE SST AP 502 may negotiate with the HE SST STA 504 to determine the TWT SPs for the HE SST STA 504. In some embodiments, the HE SST AP 502 may transmit control signaling to the HE SST STA 504 that indicates information related to the TWT SPs.

In some embodiments, the HE SST AP 502 may determine (and/or negotiate) the trigger-enabled TWT SPs for exchange of frames between the HE SST AP 502 and the HE SST STA 504 on the temporary primary channel. In some embodiments, the TWT SPs may be determined (and/or used) to enable the HE SST STA to enter a power save (PS) mode outside the TWT SPs. In some embodiments, the TWT SPs may be determined (and/or used) to enable the HE SST AP 502 to manage activity in a basic service set (BSS) in order to minimize contention between HE SST STAs 504 and to reduce an amount of time that the HE SST STAs 504 are to operate in an awake mode. Embodiments are not limited to usage of trigger-enabled TWT SPs, as TWT SPs may be used in this operation and/or other operations, in some embodiments.

In some embodiments, the HE SST AP 502 may determine (and/or negotiate) the trigger-enabled TWT SPs based at least partly on target beacon transmission times (TBTTs) of beacon frames that include delivery traffic indication maps (DTIMs). In some embodiments, the HE SST AP 502 may determine (and/or negotiate) the trigger-enabled TWT SPs based on a restriction that the trigger-enabled TWT SPs do not overlap with TBTTs at which beacon frames that include DTIMs are to be sent on the primary channel by the HE SST AP 502. In some embodiments, the HE SST AP 502 may determine (and/or negotiate) the trigger-enabled TWT SPs to not overlap with TBTTs at which beacon frames that include DTIMs are to be sent on a primary channel by the HE SST AP 502. In some embodiments, the trigger-enabled TWT SPs may be negotiated based on a restriction that the trigger-enabled TWT SPs do not overlap with TBTTs at which beacon frames that include DTIMs are to be sent on the primary channel by the HE SST AP 502.

At operation 825, the HE SST AP 502 may transmit a plurality of beacon frames. In some embodiments, the HE SST AP 502 may transmit the plurality of beacon frames on the primary channel in accordance with predetermined TBTTs. In some embodiments, each beacon frame of the plurality of beacon frames may include either a DTIM or a traffic indication map (TIM). In some embodiments, the DTIM may be configurable to indicate whether the HE SST AP 502 is to send broadcast traffic. In some embodiments, the TIM may be configurable to indicate whether the HE SST AP 502 has unicast traffic buffered for one or more HE SST STAs 504 in power save (PS) mode.

In some embodiments, the HE SST AP 502 may transmit the plurality of beacon frames in accordance with a periodicity parameter for the DTIM. In a non-limiting example, beacon frames that include the DTIM may be spaced apart by a number of beacon frames that is equal to the periodicity parameter for the DTIM.

At operation 830, the HE SST AP 502 may receive a channel switch timing element. At operation 835, the HE SST AP 502 may determine times to be used for transmission of frames to the HE SST STA 504. At operation 840, the HE SST AP 502 may exchange frames with the HE SST STA 504 during the TWT service periods.

In some embodiments, the HE SST AP 502 may receive a channel switch timing element from the HE SST STA 504. In some embodiments, the channel switch timing element may be included in an association request frame, a re-association request frame, or a management frame. In some embodiments, the channel switch timing element may indicate a duration of time in which the HE SST STA 504 is potentially unavailable to receive frames before start times of the trigger-enabled TWT SPs and after end times of the trigger-enabled TWT SPs. In some embodiments, the HE SST AP 502 may transmit frames to the HE SST STA 504 during the TWT SPs based on the duration of time indicated in the channel switch timing element.

In some embodiments, the HE SST AP 502 may determine times to be used for transmission of one or more frames to the HE SST STA 504 during the TWT SPs. In some embodiments, the times may be determined to ensure that corresponding responses from the HE SST STA 504 are within the TWT SPs. The HE SST AP 502 may transmit the one or more frames to the HE SST STA 504 during the TWT SPs. In some embodiments, the HE SST AP 502 may transmit the one or more frames to the HE SST STA 504 on the temporary primary channel during the TWT SPs based on the duration of time indicated in the channel switch timing element.

In some embodiments, an apparatus of an HE SST AP 502 may comprise memory. The memory may be configurable to store information related to the trigger-enabled TWT SPs. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding one or more beacon frames. The apparatus may include a transceiver to transmit the one or more beacon frames. The transceiver may transmit and/or receive other blocks, messages and/or other elements.

At operation 905, the HE SST STA 504 may exchange control signaling with the HE SST AP 502.

At operation 910, the HE SST STA 504 may negotiate a temporary primary channel for the HE SST STA 504. In some embodiments, the HE SST STA 504 may negotiate with the HE SST AP 502 to determine the temporary primary channel for the HE SST STA 504. In some embodiments, the HE SST STA 504 may receive control signaling (from the HE SST AP 502 and/or other component) that indicates the temporary primary channel for the HE SST STA 504. In some embodiments, the HE SST STA 504 may determine the temporary primary channel for the HE SST STA 504.

At operation 915, the HE SST STA 504 may communicate with the HE SST AP 502 in a plurality of channels. Non-limiting example bandwidths of the channels include 20 MHz, 80 MHz and/or other. In some embodiments, the HE SST STA 504 may support communication in a bandwidth of 20 MHz. In some embodiments, the HE SST STA 504 may support "20 MHz only" operation. In some embodiments, the HE SST STA 504 may communication in a single channel of bandwidth of 20 MHz during any time period, but may switch between 20 MHz channels. Embodiments are not limited to the bandwidth of 20 MHz, however, as other bandwidths (such as 80 MHz and/or other) may be used, in some embodiments.

At operation 920, the HE SST STA 504 may negotiate trigger-enabled TWT service periods. In some embodiments, the HE SST STA 504 may determine the trigger-enabled TWT service periods. In some embodiments, the HE SST STA 504 may negotiate with the HE SST AP 502 to determine the trigger-enabled TWT service periods. In some embodiments, the HE SST STA 504 may receive control signaling that indicates the trigger-enabled TWT service periods. Embodiments are not limited to usage of trigger-enabled TWT service periods, as TWT service periods may be used in some embodiments.

At operation 925, the HE SST STA 504 may receive one or more beacon frames. At operation 930, the HE SST STA 504 may transmit a channel switch timing element. At operation 935, the HE SST STA 504 may exchange frames with the HE SST AP 502 during the TWT service periods.

In some embodiments, the HE SST STA 504 may transmit an association request frame, a re-association request frame, management frame and/or other frame to the HE SST AP 502. In some embodiments, the association request frame, re-association request frame, management frame and/or other frame may include a channel switch timing element. The channel switch timing element may indicate information, including but not limited to information related to a duration of time in which the HE SST STA 504 is potentially unavailable to receive frames before start times of the trigger-enabled TWT SPs and after end times of the trigger-enabled TWT SPs.

In some embodiments, the HE SST STA 504 may perform one or more of: receive one or more frames received from the HE SST AP 502 during one of the trigger-enabled TWT SPs on the temporary primary channel; switch from the temporary primary channel to the primary channel; and receive a beacon frame that includes a DTIM, wherein the beacon frame may be received on the primary channel.

In some embodiments, the HE SST STA 504 may perform one or more of: receive one or more frames from the HE SST AP 502 during one of the trigger-enabled TWT SPs on the temporary primary channel; and enter a power save (PS) mode after the TWT SP in which the one or more frames are received.

In some embodiments, an apparatus of an HE SST STA 504 may comprise memory. The memory may be configurable to store information related to the trigger-enabled TWT SPs. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding one or more beacon frames. The apparatus may include a transceiver to receive the one or more beacon frames. The transceiver may transmit and/or receive other blocks, messages and/or other elements.

Figure 13:
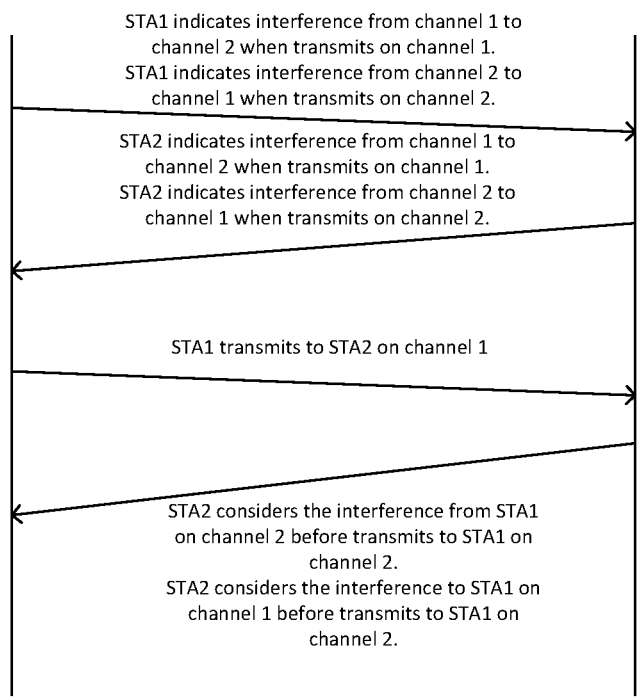
FIG. 13 illustrates example operations in accordance with some embodiments.
Figure 14:
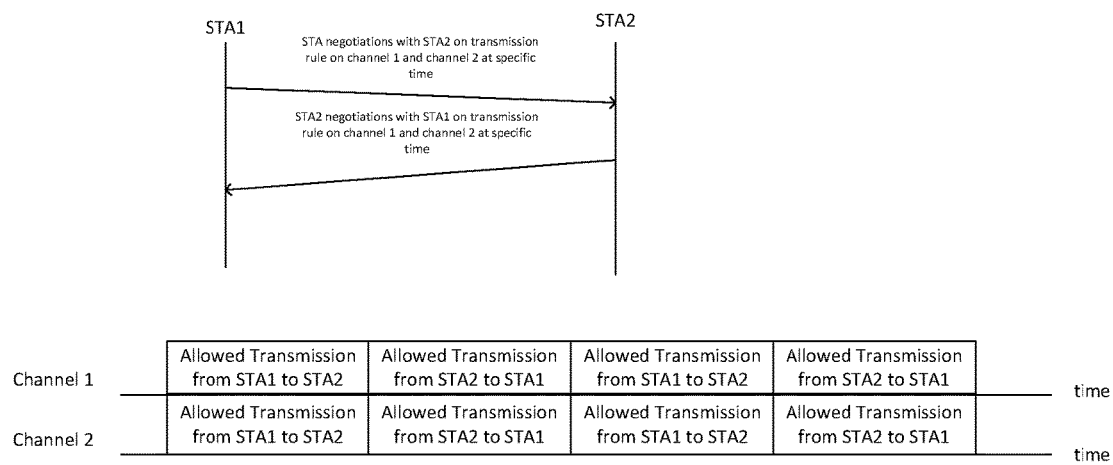
FIG. 14 illustrates example operations in accordance with some embodiments.
Figure 15:
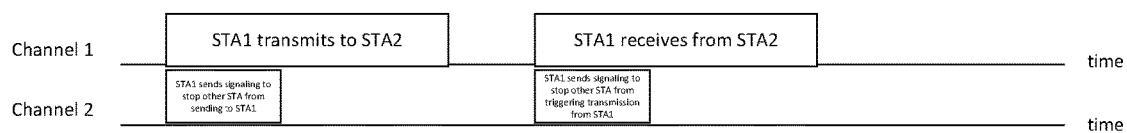
FIG. 15 illustrates example operations in accordance with some embodiments.
Figure 17:
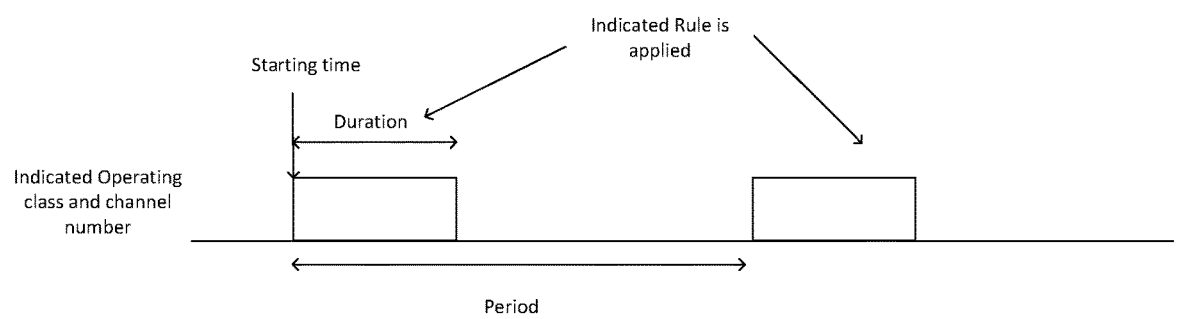
FIG. 17 illustrates example operations in accordance with some embodiments.

FIG. 10 illustrates examples of channel switch behavior in accordance with some embodiments. FIG. 11 illustrates an example target wake time (TWT) element format in accordance with some embodiments. FIG. 12 illustrates example scenarios in accordance with some embodiments. FIG. 13 illustrates example operations in accordance with some embodiments. FIG. 14 illustrates example operations in accordance with some embodiments. FIG. 15 illustrates example operations in accordance with some embodiments. FIG. 16 illustrates example elements in accordance with some embodiments. FIG. 17 illustrates example operations in accordance with some embodiments.

It should be noted that the examples shown in FIGS. 10-17 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-17. Although some of the elements shown in the examples of FIGS. 10-17 may be included in a WLAN standard, Wi-Fi standard, 802.11 standard, 802.11ax standard and/or other standard, embodiments are not limited to usage of such elements that are included in standards.

In some embodiments, in a target wake time (TWT) negotiation, including but not limited to a TWT negotiation included in an 802.11 ah protocol, a TWT requesting STA 504 that used a portion of the AP operation BW can set the TWT Channel field to indicate a temporary primary channel during the TWT service period. This temporary primary channel may act as a temporary substitute to the primary channel of the AP 502.

In some embodiments, one or more techniques, concepts and/or operations related to 802.11 ah TWT functionality (and/or similar techniques, concepts and/or operations) may be included in an 802.11ax protocol. Such a feature may provide power save and efficient scheduling between AP 502 and STAs 504, in some cases. Although the basic operation bandwidth of 802.11ah (1 MHz) and 802.11ax (20 MHz) is different, it may be possible to extend the temporary primary channel indication to 802.11ax to allow 20 MHz only device to operate on a temporary primary 20 MHz channel different from the primary 20 MHz channel of the associated BSS during the negotiated TWT service period (SP).

In some cases, an 802.11ax TWT operation mode and functionality may not fully support a requesting STA 504 that used a portion of the AP operation BW. Consider a TWT SP with negotiated temporary primary channel. In some cases, enabling of temporary primary channel operation for 11ax devices may introduce one or more of the following 3 gaps. Gap #1 is related to target beacon transmission time (TBTT) of delivery traffic indication map (DTIM) overlap. The TWT SP with temporary primary channel may overlap with the TBTT of DTIM beacon, which may prevent the non-AP STA 504 from listening the DTIM beacon. Note that listening to the DTIM beacon may be a mandatory requirement unless specific condition is met, in some embodiments.

In some embodiments, a STA 504 operating in PS mode that is not in WNM sleep mode shall periodically listen for Beacon frames, as determined by the ListenInterval parameter of the MLME-AS SOCIATE.request or MLME-REAS-SOCIATE.request primitive and the Receive DTIMs parameter of the MLME-POWERMGT.request primitive.

Gap #2 is related to immediate response at the end of the TWT SP. The AP 502 may transmit BU around the end of the TWT SP that requires immediate response from the non-AP STA. It may not be clear how non-AP STA 504 can perform an immediate response for this case. It also may not be clear how the AP 502 should allocate resource to receive the immediate response through Trigger-based MU operation (for instance, whether the AP 502 should allocate resources on primary channel or on temporary primary channel for immediate response).

Gap #3 is related to a channel switch operation at the start and end of the TWT. Outside of the TWT SP, the non-AP STA 504 may still operate on the primary channel of the associated BSS. In some embodiments, techniques, operations and/or methods may be related to a procedure for the channel switch operation at the start and at the end of the TWT SP.

In some embodiments, one or more techniques, operations and/or methods of an 802.11ax protocol (including but not limited to techniques, operations and/or concepts that may be at least partly based on an 802.11 ah protocol) may be used for TWT temporary primary channel negotiation/renegotiation. In some cases, such techniques, operations and/or methods may be related to one or more of Gap #1, Gap #2, and Gap #3.

In some embodiments, for Gap #1 (related to TBTT of DTIM overlap), one or more of the following solutions (and/or other solution(s)) may be used. In Solution 1 for Gap #1, DTIM skip may be used, wherein a non-AP STA 504 with TWT SP on temporary primary channel and overlapping with TBTT of DTIM is allowed to skip DTIM Beacon reception. This may be extended to a non-AP with any TWT SP, in some embodiments. In Solution 2 for Gap #1, overlap prevention may be used, wherein the TWT SP on temporary primary channel shall not overlap with the TBTT of DTIM.

For Gap #2 (related to immediate response at the end of the TWT SP), an initiated TXOP inside a TWT SP on temporary primary channel should end before the end of the TWT SP. This rule can be extended to any TWT SP, in some embodiments.

For Gap 3 (related to channel switch operation at the start and at the end of the TWT), one or more of the following solutions (and/or other solution(s)) may be used. In Solution 1 for Gap #3, an open loop technique using Max channel switch time may be used. A maximum channel switch time may be defined. Corresponding operation rules based on the maximum channel switch time may be used. In Solution #2 for Gap #3, a closed loop technique using PS mode indication may be used. The TWT agreement may only apply if the non-AP STA 504 is in PS mode. If the non-AP STA 504 is in active mode, the TWT SP may end immediately, in some embodiments.

In some embodiments, for a TWT SP in temporary primary channel, one or more of the techniques, operations and/or methods described herein may be related to one or more of: DTIM operation, the TXOP operation around the end of the TWT SP, and the expected channel switch behavior at the start or end of a TWT SP.

For Gap #1 (related to TBTT of DTIM overlap), for Solution 1 of Gap #1, DTIM skip may be performed, wherein a non-AP STA 504 with TWT SP on temporary primary channel and overlapping with TBTT of DTIM is allowed to skip DTIM Beacon reception. This rule can be extended to a non-AP with any TWT SP. In Solution #2 for Gap #1, overlap prevention may be performed, wherein the TWT SP on temporary primary channel shall not overlap with the TBTT of DTIM.

For Gap 2 (related to immediate response at the end of the TWT SP), for TXOP operation at the end of a TWT SP: an initiated TXOP inside a TWT SP on temporary primary channel should end before the end of the TWT SP. In some embodiments, the rule can be extended to any TWT SP. In some embodiments, the rule can be a mandatory requirement.

For Gap #3 (related to channel switch operation at the start and at the end of the TWT), for Solution 1 for Gap #3, an open loop technique using Max channel switch time may be used. A maximum channel switch time, say T, may be defined. The maximum channel switch time may be referred to, without limitation, as a "Max Channel Switch time" in some of the descriptions herein. Corresponding operation rules based on the Max Channel Switch time may be used. In some embodiments, the Max Channel Switch time can be indicated by the non-AP STA in HE MAC capabilities element. In some embodiments, the Max Channel Switch time can be indicated by the non-AP STA in a specific element. In some embodiments, the Max Channel Switch time can be defined in the spec that applies to any HE non-AP STA 504. In some embodiments, a non-AP STA 504 may not be available for a duration of T before a TWT SP if channel switch is required for the non-AP STA 504 to operate on the temporary primary channel of the TWT SP. As an alternative, the non-AP STA 504 may not be available for a duration of T after the start of a TWT SP if channel switch is required for the non-AP STA 504 to operate on the temporary primary channel of the TWT SP. In some embodiments, the non-AP STA 504 may not be available for a duration of T before the end of a TWT SP if after the TWT SP, channel switch is required for the non-AP STA 504 to operate on a primary channel or on temporary primary channel which is different from the temporary primary channel of the TWT SP.

As an alternative, the non-AP STA 504 may not be available for a duration of T after the end of a TWT SP if after the TWT SP, channel switch is required for the non-AP STA 504 to operate on a primary channel or on temporary primary channel which is different from the temporary primary channel of the TWT SP.

In some embodiments, a rule may be applied, wherein TWT SPs with different temporary primary channels are required to be separated in time by a duration of T, for some value (predetermined or otherwise) of T. Note that for a STA 504 that operates on active mode, this rule alone may not necessarily resolve the channel switch ambiguity.

Non limiting examples 1000 and 1050 of channel switch behavior are shown in FIG. 10.

For Solution 2 for Gap #3, a closed loop technique using PS mode indication may be used. The TWT agreement may only apply if non-AP STA 504 is in PS mode. If the non-AP STA 504 is in active mode, the TWT SP will end immediately. This may imply that a non-AP STA 504 always operates on the primary channel of the associated BSS if the non-AP STA 504 is in active mode, although the scope of embodiments is not limited in this respect.

In some embodiments, a TWT mode for 20 MHz-only STAs 504 may be used. In 802.11ax, multi-user operation has been defined over all different bandwidth (20/40/80/160 MHz). Some STAs 504 will however only support 20 MHz operation. We call them 20 MHz-only STAs 504. The specification has been defined so that 20 MHz-only STAs 504 can also participate in multi-user operation even if the bandwidth of the multi-user PPDU is larger than 20 MHz. Now, those 20 MHz-only STAs 504 could only be scheduled in the primary 20 MHz part of the PPDU, even if this PPDU has a larger BW.

In order to better multiplex in frequency those 20 MHz-only STAs 504 (including but not limited to scenarios in which there are many 20 MHz-only STAs 504), it is being proposed to define operation on secondary channel for those 20 MHz STAs 504. The idea is to negotiate with the AP 102 a service period during which these 20 MHz-only STAs 504 will move to a secondary 20 MHz channel. Within this SP, the 20 MHz-only STAs 504 can then be only triggered by the AP 102 to send UL TB PPDUs on their secondary 20 MHz channels (even part of an UL TB PPDU of larger BW) or be delivered DL MU to multiple STAs 504, including these 20 MHz-only STAs 504 on their operating secondary channel. This allows to multiplex in frequency multiple 20 MHz-only STAs 504 and schedule them in the same UL TB PPDU or the same DL MU PPDU. The protocol will be based on TWT to define the service period and will use the TWT channel field which is a 8-bit bitmap with each bit corresponding to one 20 MHz channel in the BSS bandwidth, and only a single bit can be set to 1 to indicate the channel on which the STA 504 will be operating during the SP.

In some embodiments, multi-band multi-segment operation may be used. In parallel to this, especially for next generation (NBT), a very important feature will be multi-band operation. More specifically, we talk here about multi-radio operation on multiple frequency segments. We define the segment as a number of contiguous channels, for instance 4 20 MHz channels forming an 80 MHz channel. CDB (concurrent dual band) devices can have multiple radios and be able to operate on multiple segments simultaneously. Single radio device can operate on only one segment simultaneously.

Here, we consider the case in which an AP 102 is CDB and can operate simultaneously on 2 or more segments, and those segments can be in any bands (2.4/5/6 GHz). An AP 102 can operate for instance with: an 80 MHz segment at 5 GHz and 80 MHz segment at 6 GHz; an 80 MHz segment at 5 GHz (lower band) and 80 MHz segment at 5 GHz (upper band); an 80 MHz segment at 5 GHz (lower band) and 80 MHz segment at 6 GHz (upper band); and/or other. A STA 504 is either multi-radio CDB or is single-radio. In the single-radio case, it can support operation in some or all segments, but only operate on one segment at a time. With such assumptions, we want next generation to define solutions for the different use cases, especially the following: load balancing across segments for any STAs 504, switching groups of STAs 504 from one segment to another; separation of data and control plane for any STAs 504, management in one segment, data in another segment; aggregation across segments for CDB STAs 504, simultaneous operation on multiple segments; and/or other.

So far, we have considered that, to enable such operation, we consider that the CDB AP operating on 2 segments is actually made of 2 AP STAs, i.e., AP with different MAC address, one on each segment/band. This way, in each segment/band, the AP STA is regulating BSS operation, and the STA 504 can associate to the AP 502 to be able to operate in that segment. This way, transitions between 2 segments is equivalent to the BSS transition between 2 APs 502 (STA 504 disassociate from the first AP 502 and re-associate to the second AP 502), and simultaneous operation from a STA 504 on 2 segments can be enabled by allowing multiple simultaneous association from that STA 504 with each of the 2 APs 502 or by considering two collocated non-AP STAs, i.e., non-AP STA with different MAC address, and each non-AP STA connects to a specific AP STA. 2 APs 502, one on each band requires a protocol for separation of data and control across multiple APs 502 to move STAs 504 from one AP 502 to another, to handle association and/or other operations. If we have a single AP 502 across the 2 bands, all separation of data and control are natively done.

Now that a TWT mode for operation on secondary channel is being developed, we consider a simplified mode of operation where the AP 502 which is operating on the 2 segments is actually a single AP 502, i.e., an AP 502 with the same MAC address on difference operating segment. Similarly, a non-AP STA which is operating on the 2 segments is actually a single STA 504, i.e., a non-AP STA with the same MAC address on difference operating segment.

It is proposed to extend the protocol for 20 MHz-only STAs 504 on secondary channel with TWT: in order to allow 40 MHz STAs, 80 MHz STAs, 160 MHz STAs, 320 MHz STAs to operate on secondary channel and use the same protocol approach using TWT; in order to allow the bandwidth of the BSS to be up to 320 MHz or even more; in order to allow the BSS to be operating on multiple segments, each segment being possibly on different bands (for instance one at 5 GHz, one at 6 GHz), and to allow the protocol to move a STAs 504 to a different segment (segment made of multiple secondary channels), or to a particular secondary channel of another segment; in order to allow STAs 504 and AP 502 to negotiate to possibility for the STAs 504 to use or not EDCA access, in addition to triggered access in UL, when operating on another segment or secondary channel; and/or to allow APs 502 to initiate the negotiation or unilaterally decide this for the STA 504 by using the unsolicited TWT request mode.

A potential advantage of one or more of the techniques, operations and/or methods described herein is the support for multi-band with a single AP 502 that is operating on multiple bands. This may allow natively a single association across the bands, and sending management frames in the primary channel (main band), and data on secondary channels (other band/segment).

In a current protocol for 20 MHz-only STAs 504, the TWT element 1100 is shown in FIG. 11. Currently in the 802.11ax specification, the TWT channel field is reserved, while it was used by the 802.11ah specification. With a modification proposed herein for 20 MHz-only STAs 504, the TWT Channel field is used with the following protocol to enable temporary primary channel operation. When transmitted by a TWT requesting STA 504 that is not neither an S1G STA 504 nor an HE STA 504 with dot11HETemporaryPrimaryChannelImplemented equal to true, the TWT Channel field is reserved. When transmitted by a TWT requesting STA 504 that is either an S1G STA 504 or an HE STA 504 with dot11HETemporaryPrimaryChannelImplemented equal to true, the TWT Channel field contains a bitmap indicating which channel the STA 504 requests to use as a temporary primary channel during a TWT SP. When transmitted by a TWT responding STA 504 that is either an S1G STA 504 or an HE STA 504 with dot11HETemporaryPrimaryChannelImplemented equal to true, the TWT Channel field contains a bitmap indicating which channel the TWT requesting STA 504 is allowed to use as a temporary channel during the TWT SP. Each bit in the bitmap corresponds to one minimum width channel for the band in which the TWT responding STA's 504 associated BSS is currently operating, with the least significant bit corresponding to the lowest numbered channel of the operating channels of the BSS. In an S1G BSS, the minimum width channel is equal to the SST Channel Unit field of the SST Operation element if such an element has been previously received or is equal to 1 MHz for a BSS with a BSS primary channel width of 1 MHz and 2 MHz for a BSS with a BSS primary channel width of 2 MHz if no such element has been previously received from the AP 502 to which the SST STA 504 is associated. In an HE BSS, the minimum width channel is equal to 20 MHz. A value of 1 in a bit position in the bitmap transmitted by a TWT requesting STA 504 means that operation with that channel as the primary channel is requested during a TWT SP. A value of 1 in a bit position in the bitmap transmitted by a TWT responding STA 504 means that operation with that channel as the primary channel is allowed during the TWT SP. In an HE BSS, only one bit of the bitmap can have a value of 1. The TWT Channel field is not present when the Broad-cast field has the value 1.

A TWT requesting STA 504 and a TWT responding STA 504 may set up a TWT with a temporary primary channel for enabling frame exchanges on a 20 MHz subchannel of a secondary 20 MHz, secondary 40 MH, or secondary 80 MHz channel. In which case, the TWT requesting STA 504 and the TWT responding STA 504 follow the rules described in this subclause. When an HE STA 504 implements the Temporary Primary Channel operation described in this subclause, it shall set dot11HETemporaryPrimaryChannelImplemented to true.

A TWT requesting STA 504 with dot11HETemporaryPrimaryChannelImplemented equal to true may set one bit in the TWT Channel field of the TWT request frame to 1 to request a temporary primary channel, when a TWT responding STA 504 has set the Temporary Primary Channel Support field to 1 in the HE Capabilities element it transmits. The temporary primary channel requested in the TWT request frame shall not be outside of the BSS bandwidth.

After receiving the TWT request frame of which the TWT Channel field has a non-zero bit value, a TWT responding STA 504 with dot11HETemporaryPrimaryChannelImplemented equal to true may set one bit in the TWT Channel field of the TWT response frame to 1 to indicate a temporary primary channel. The temporary primary channel indicated in the TWT response frame shall not be outside of the BSS bandwidth.

During the negotiated trigger-enabled TWT SPs, an HE AP 502 that is under the TWT agreement shall allocate an RU within the temporary primary channel specified in the TWT Channel field of the TWT response frame and follow the RU restriction rules defined in 28.3.3.6 (RU restrictions for 20 MHz operation), when allocating an RU in an HE MU PPDU or HE TB PPDU to a non-AP STA 504 that is under the TWT agreement.

During the negotiated trigger-enabled TWT SPs, the non-AP STA 504 that is under the TWT agreement shall move to a temporary primary channel specified in the TWT Channel field of the TWT response frame. The non-AP STA 504 shall not access the medium on the temporary primary channel using a DCF and EDCAF.

In some embodiments, not only 20 MHz-only STAs 504, but also 40 MHz, 80 MHz, 160 MHz STAs 504 may be moved to a temporary secondary 20/40/80/160 MHz. In order to enable this, it is proposed herein to no longer restrict temporary channel operation to STAs 504 with the 20 MHz-only capability true, but to allow it for all STAs 504. It is also proposed herein to simply allow the TWT Channel subfield to have more than one bit set to 1. This single bit currently indicates the temporary primary channel for operation during the TWT SP. It is proposed that if multiple bits are set to 1, the temporary primary channel is wider than 20 MHz and is made of all the 20 MHz channel that have the bit set to 1 in the bitmap of the TWT Channel field. For instance, for an 160 MHz BSS contiguous BW, a possible temporary primary channel defined on the secondary 80 MHz can be signaled by the bitmap 00001111. With this example, during the TWT SP, the STA 504 will operate on the secondary 80 MHz.

Note that if we allow a STA 504 to operate on a temporary primary channel larger than 20 MHz, we may need to define the temporary 20 MHz primary channel and the temporary secondary channels that constitute the temporary primary channel. Or instance if the temporary channel is 40 MHz, and made of 2 20 MHz channels, which of these 2 20 MHz channels is the primary channel on which the STA 504 is required to check NAV and operate with EDCA access and large BW according to one or more 802.11 rules.

This primary channel can be indicated by another field which is: either also a bitmap with all channels and only one of the bit is set to 1 to indicate the primary 20 MHz channel; or it is a smaller field that indicate the index of the 20 MHz in the order of the bitmap of the TWT channel field. For instance if the bit in $3^{rd}$ position would be set to 1 to indicate the primary channel, the field would carry the value 3−1=2.

The primary channel can also be indicated outside of the TWT element, as it is a long term indication for the BSS operation. That can then be in the operation element of the BSS, which is included in beacons and probe and (re)association responses or any other elements, such as the one that is used to describe the operating BW of the BSS.

In some embodiments, the bandwidth of the BSS may be allowed to be up to 320 MHz or even more. In order to enable this, one or more of the following are proposed. The TWT Channel field may be modified so that it is now made of 2 Bytes instead of 1 Byte. This way the TWT channel field is have a 16-bit bitmap, to represent the 16 20 MHz channels for a BSS bandwidth operation on 320 MHz. Specifically, an additional 8 bits are added at the end of the TWT element to signal TWT channel extension field. If the 20 MHz channel are numbered from the lowest number 20 MHz channel to the highest number 20 MHz channel, the xth least significant bit of the TWT corresponding to the (8+x)th numbered 20 MHz channel.

Another alternative is to indicate that the bitmap of the TWT Channel field is kept as a 8-bit bitmap, but that each bit is now representing a 40 MHz channel, instead of a single 20 MHz channel. This can be extended to 640 MHz BSS support by having each bit representing 1 80 MHz channel. The way to understand how to interpret the TWT Channel bitmap (20 MHz channel per bit or 40 MHz channel per bit) may be defined as one or more of the following. In an implicit technique: if the bandwidth of the BSS is set to up to 160 MHz, then one bit of the bitmap of the TWT Channel field is representing a 20 MHz channel; if the bandwidth of the BSS is set to up to 320 MHz, then one bit of the bitmap of the TWT Channel field is representing a 40 MHz channel; if the bandwidth of the BSS is set to up to 640 MHz, then one bit of the bitmap of the TWT Channel field is representing a 80 MHz channel. In an explicit technique, a field is defined (new or repurposed) to indicate the bandwidth represented by one bit of the bitmap of the TWT Channel field. This field can be in the HE or NBT operation element, or in a new element broadcasted by the AP 502 in beacons and probe and (re)association responses, or in the TWT element itself, for instance one of the reserved bits in the Control field in the TWT element. This can be a one-bit or 2-bit field: set to 0 for 20 MHz, set to 1 for 40 MHz. Additional extension field can also be added to the TWT element.

In some embodiments the BSS may be allowed to operate on multiple segments, each segment being possibly on different bands (for instance one at 5 GHz, one at 6 GHz), and to allow the protocol to move STAs 504 to a different segment (segment made of multiple secondary channels), or to a particular secondary channel of another segment.

With this solution, the support for multiple segments is straightforward, with the BSS defining its BW operation by defining the segments and its channels with the fields BSS Bandwidth, Channel center frequency segment 0, Channel center frequency segment 1, Channel center frequency 2 as defined in 11ac/ax (note that this could be extended to more number of segments in NBT).

The TWT Channel subfield has a bitmap with each bit representing all the 20 MHz channels (or 40 MHz . . . ) in the BSS bandwidth. We need a clear unambiguous mapping between each bit and the 20 MHz channels in the case of BSS bandwidth with multiple segments. Currently, the bitmap is defined as the list of 20 MHz channels with the least significant bit corresponding to the channel with the lowest numbered channel. This will be working for most of the cases. In case the secondary segment is on another operating class (other band) and has a number which is lower, this can work unambiguously, but we can also define it with another solution in the case of multiple segments. The least significant bits are for the first segment and the most significant bits are for the last segment and each segment has the number of bits representing the total BW of each segment (2 bits for 40 MHz segment for instance if each bit represents a 20 MHz channel).

To move one STA 504 to a secondary segment, the bits corresponding to the channels in the secondary segments are set to 1 and the bits corresponding to the channels in the primary segment are set to 0.

In some embodiments, the STAs 504 and AP 502 may be allowed to negotiate to possibility for the STAs 504 to use or not EDCA access, in addition to triggered access in UL, when operating on another segment or secondary channel. Currently, operation on secondary channel (temporary primary channel) only allows triggered access in UL (transmission in response to a trigger frame).

With multiple segments on different bands (or the same), it is possible that the 2 segments can operate fully asynchronously (assuming sufficient isolation against leakage between the bands/segments) and in such case, EDCA access from the STAs 504 in UL can also be allowed on the temporary primary channel.

In order to enable this, one or more of the following options may be used. In one option, an indication in the TWT element itself may be used. A field (1-bit) may be defined, for instance a reserved bit in the Control field of the TWT element or an extension field of TWT element, that is set to 1 to indicate that EDCA is possible and is set to 0 to indicate that EDCA is not possible on the temporary primary channel during the SP. In another option, an indication in another element may be used. It may be defined as a long-term characteristic of the BSS (2 segments asynchronous with the possibility for STAs 504 to do EDCA when operating only on one segment). This can then be a bit in the operation element of the BSS or a bit in the element describing the BW of the BSS for instance.

In some embodiments, APs 502 may be allowed to initiate the negotiation or unilaterally decide this for the STA 504 by using the unsolicited TWT request mode. This is simply done by allowing the AP to use the unsolicited TWT response, meaning without having received a TWT request by the STA 504. In such case, the AP 502 can send the TWT response including the TWT element describing the operation on a temporary primary channel as defined here to a particular STA 504 and the reception of it (and acknowledgement) validates the negotiation without a response from the STA 504. This is unilaterally decided by the AP 502 in such case. The STA 504 can then tear down the TWT to cancel it and get back to normal operation if it is not happy with the TWT mode.

For next generation Wi-Fi, a very important feature will be multi-band operation. More specifically, we talk here about multi-radio operation on multiple frequency segments. We define the segment as a number of contiguous channels, for instance 4 20 MHz channels forming an 80 MHz channel. CDB (concurrent dual band) devices can have multiple radios and be able to operate on multiple segments simultaneously. Single radio device can operate on only one segment simultaneously.

Here, we consider the case in which an AP 502 is CDB and can operate simultaneously on 2 or more segments, and those segments can be in any bands (2.4/5/6 GHz). An AP 502 can operate for instance with: 80 MHz segment at 5 GHz and 80 MHz segment at 6 GHz; 80 MHz segment at 5 GHz (lower band) and 80 MHz segment at 5 GHz (upper band); 80 MHz segment at 5 GHz (lower band) and 80 MHz segment at 6 GHz (upper band); and/or other. A STA 504 is either multi-radio CDB or is single-radio. In the single-radio case, it can support operation in some or all segments, but only operate on one segment at a time.

With such assumptions, we want next generation to define solutions for the different use cases, especially the following: load balancing across segments for any STAs: switching groups of STAs from one segment to another; separation of data and control plane for any STAs: management in one segment, data in another segment; aggregation across segments for CDB STAs: simultaneous operation on multiple segments.

In some cases, to enable such operation, we consider that the CDB AP 502 operating on 2 segments is actually made of 2 AP STAs, i.e., AP 502 with different MAC address, one on each segment/band. This way, in each segment/band, the AP STA 504 is regulating BSS operation, and the STA can associate to the AP 502 to be able to operate in that segment. This way, transitions between 2 segments is equivalent to the BSS transition between 2 APs 502 (STA disassociate from the first AP 502 and re-associate to the second AP 502), and simultaneous operation from a STA 504 on 2 segments can be enabled by allowing multiple simultaneous association from that STA 504 with each of the 2 APs 502 or by considering two collocated non-AP STAs, i.e., non-AP STA with different MAC address, and each non-AP STA connects to a specific AP STA.

In some embodiments, a simplified mode of operation may be used, wherein the AP 502 which is operating on the 2 segments is actually a single AP 502, i.e., an AP 502 with the same MAC address on difference operating segment. Similarly, a non-AP SA which is operating on the 2 segments is actually a single STA 504, i.e., a non-AP STA with the same MAC address on difference operating segment.

There are currently also some discussions to define operation on non-primary channel for 20 MHz-only STAs 504. A mechanism currently proposes to define a new channel switch request and response frame, which includes a new element. These frames are exchanged between the AP 502 and the STA 504 as a 2-way handshake to enable the negotiation of the parameters. One or more of the following may be enabled: moving a STA 504 to a non-primary 20 MHz channel, wherein in such cases, the STA 504 cannot perform EDCA and can only be triggered by the AP 502; allowing the STA 504 to come back to the primary channel if not triggered by the AP 502 after a specific timeout; defining specific time duration to prevent AP 502 from triggering on the non-primary 20 MHz channel so that STA 504 can switch to the primary 20 MHz channel to listen for beacons.

In some embodiments, one or more techniques, operations and/or methods may be used/extended to enable the multi-band/multi-segments use cases that were described earlier but we make a clear separation between segments and channels. One segment is made of one or more channels, and if more than one, there is a primary channel and secondary channels. An STA 504 may therefore be moved to the second segment for instance. And within that segment, it can then be moved to a non-primary channel.

In some embodiments, one or more techniques, operations and/or methods may enable a single AP 502 to operate with a single BSS operation, but on multiple segments (segments can be in the same or different bands and are made of one or more adjacent channels). The STAs 504 associate only once with this AP 502 and perform security and all other pre-association process only once and can then operate on any segments, but under the guidance of the AP 502.

In some embodiments, one or more techniques, operations and/or methods may enable the AP 502 to signal the segments on which is operates (channel indexes, band index, what is the primary/secondary channels and/or other) and the mode of operation on each segment: whether non-AP STAs are allowed to do EDCA on a segment or not; whether management frames of non-AP STAs are allowed in segment or not; whether management frames of an AP 502 (such as beacons and/or other) are transmitted in primary channel of the segment or not (the segment with the transmission of beacons can be called the primary segment).

In some embodiments, one or more techniques, operations and/or methods may enable the AP 502 and its associated STAs 504 to switch the STA 504 to operate in one or multiple of the existing segments, such as: new or enhanced existing request and response frames to enable the transition of one STA 504 from one segment to the other; and/or within a segment containing multiple channels, request and response frames to enable the transition from one STA 504 from the primary channel to a non-primary channel.

A STA Channel Switch Request frame Action field format is shown in the table below.

| Order | Information | Notes |
|---|---|---|
| 1 | Category | The Category field is defined in 9.4.1.11. |
| 2 | HE Action | The HE Action field is defined in 9.6.28.1. |
| 3 | Dialog Token | The Dialog Token field contains an unsigned integer which is used to associate a STA Channel Switch Request with a STA Channel Switch Response. |
| 4 | STA Channel Switch Request | The STA Channel Switch Request element is defined in 9.4.2.226 (STA Channel Switch Request element) |

In some embodiments, a channel switch request action frame may be defined, which includes a channel switch request element, which is defined as shown below.

| | STA Channel Switch element | | | | |
|---|---|---|---|---|---|
| Element ID | Length | Element ID Extension | Channel Index | Primary Channel Period | Non-Primary Channel Operation Timeout |
| Octets: 1 | 1 | 1 | 1 | 1 | 1 |

The channel index defines the 20 MHz channel on which the STA will operate, the Timeout defines the time without being triggered by the AP after which the STA can go back to the primary channel.

It is proposed that: A) to define either a complete new mechanism for segment switch with segment switch request and response frames, which include segment switch request and response elements; or B) to enhance the channel switch request and response action frames, to include as optionally present elements: new elements "segment switch request and response elements", existing channel switch request and response elements; or C) to just modify the channel switch request and response elements, in order to add some fields to enable segment switch in addition to channel switch.

For proposal A and B, new action frames are proposed specifically for segment switch. The table below illustrates an STA Segment Switch Request frame Action field format.

| Order | Information | Notes |
|---|---|---|
| 1 | Category | The Category field is defined in 9.4.1.11. |
| 2 | HE Action | The HE Action field is defined in 9.6.28.1. |
| 3 | Dialog Token | The Dialog Token field contains an unsigned integer which is used to associate a STA Segment Switch Request with a STA Segment Switch Response. |
| 4 | STA Segment Switch Request | The STA Segment Switch Request element |
| 5 | STA channel Switch Request | |

| STA Segment Switch element | | | | | |
|---|---|---|---|---|---|
| Element ID | Length | Element ID Extension | Segment Index | Segment control | Non-Primary Segment Operation Timeout (optional) |
| Octets: 1 | 1 | 1 | 1 | 1 | 1 |

The segment index is a bitmap with one bit associated with each segments that the AP operates on. This solution relies on the fact that the AP 502 has announced in another element (in beacon, probe response, (re)association response) how to define the segments in order (index of the channel for the primary channel and for all secondary channels, or index of the entire 40-80-160 MHz) and the index of each segment. (example: segment 0: 80 MHz channel on channels 36-40-44-48, with primary channel 36; segment 1: 80 MHz channel on channels 149-153-157-161, with primary channel 149).

If the bit corresponding to one segment is set to 1, the STA 504 will operate in this segment. If it is set to 0 it will not operate in that segment. If 2 or more bits are set, the STA 504 will operate simultaneously on multiple segments.

Alternatively, we can also define the exact channel numbers of the new segment (or segments) that will be used by the STA 504 with specific segment BW fields and segment primary channel index fields, or any other ways to derive the center frequency and BW of the segment and of the primary channel.

The Segment control field can be used to define the operation of the STA 504 when operating on its new segment. We can include a field to indicate if there is a primary segment or if all segments are equal, and in the primary segment case, another field to indicate which segment is the primary segment. If all segments are equal, first association and other features are available in all bands.

We can include a field to indicate whether management frames are allowed in the new segment, or in which segment if the STA 504 operates on multiple segments. We can include a field to indicate if EDCA is allowed in the new segment or not. Alternatively, it is also possible to add the EDCA parameter set element or any other channel access restriction element in the segment switch action frame to describe the channel access methods in the new segment. We can include a field to indicate a period for disallowing AP 502 to trigger operation on some segments, say non-primary segment, to allow the STA 504 to switch to other segments, say primary segment for operation.

The timeout can also be optionally present, mostly in the case where there is a primary segment and that management traffic is not allowed in the other segment. In such case, a timeout can be defined so that the STA 504 automatically falls back to the primary segment if not triggered by the AP 502 for the timeout duration. It can also be designed that the STA 504 can always use the primary segment for management frames.

The segment switch request and response action frames can also include one or more channel switch elements. In this case, this element describe the channel switch within the segment that is described in the segment switch element (the segment on which the STA 504 will move to) and defines on which non-primary channel of this segment, the STA 504 will be switched.

In "Proposal C," another solution is to use the same channel switch request and response action frames, and the same channel switch element, but to extend the channel switch element in order to include all the fields that will be useful to also enable segment switch. In proposal, we include all the fields that were proposed in the new STA Segment switch element.

| STA Channel Switch element | | | | | | | | |
|---|---|---|---|---|---|---|---|---|
| Element ID | Length | Element ID Extension | Channel Index | Primary Channel Period | Non-Primary Channel Operation Timeout | Segment index | Segment control | Segment Timeout (optional) |
| Octets: 1 | 1 | 1 | 1 | 1 | 1 | 1 | 1 | 1 |

For IEEE 802.11 Next Big Thing (NBT) development of next generation Wi-Fi, the main focus is on the collaborative multi-radio multi-band operation. Specifically, it is envisioned that an AP (or non-AP STA) can provide a service that one or more radios that can operate on one or more bands simultaneously or non-simultaneously. The collaborative multi-radio and multi-band capability can then enable various kinds of new use cases. In a use case (which may be referred to herein as "use case 1" without limitation), a STA can be served by multi-radio multi-band aggregation with another peer STA to increase the goodput significantly as shown in 1200 in FIG. 12.

As another use case (which may be referred to herein as "use case 2" without limitation), a STA (like an AP range extender) can utilize different radios (simultaneously or non-simultaneously) operated at different bands to connect to different STAs, say one AP and one non-AP STA, as shown in 1230 in FIG. 12.

As another use case (which may be referred to herein as "use case 3" without limitation), an AP may connect to more than one STA at different bands (simultaneously or non-simultaneously) for each radio as shown in 1260 in FIG. 12.

For collaborative multi-radio multi-band operation, a common problem is the interference leakage (within the device and between the devices). Specifically, a transmission on one radio that operates on one band, may cause interference for another radio on the other band. For example, in 1200 in FIG. 12, if STA1 transmits to STA2 on 5 GHz band channel 1, then if STA2 transmits to STA1 on 5 GHz band channel 2, the transmission may fail due to the interference of transmission from STA1 on 5 GHz band channel 1.

Note that since IEEE 802.11 NBT operation band plan to be expend to a new bands like 6 GHz band, the interference leakage can become a more common issue that need to be considered. For example, if a radio operates on a channel in 5 GHz band, then it will have interference leakage to another radio operating on a channel in 5 GHz band or 6 GHz band.

There is a need for modifying the current IEEE 802.11 PHY and MAC protocols and add additional STA to STA coordination signaling in order to support the IEEE 802.11 Next Big Thing (NBT) collaborative multi-radio multi-band operation and in particular the use cases shown in FIG. 12.

One or more of the following techniques, which may be related to Collaborative Multi-Radio Multi-Band (C-MRMB) reporting and operation signaling between nodes (STAs for example) that operate on the same or overlap bands, may be used.

In some embodiments, with C-MRMB Reporting signaling, signaling may be used such that a STA (STA1) can indicate to peer STA or 3$^{rd}$ party STA) about the existence of interference leakage.

In some embodiments, with C-MRMB immediate coordination, signaling may be used such that a STA (STA1), can indicate to peer STA or 3$^{rd}$ party STA about the possible influence of interference leakage to stop the peer STA or 3$^{rd}$ party STA from trigger STA1 to transmit on a particular radio or halt transmission on a particular radio or RUs.

In some embodiments, with C-MRMB resource allocation and transmission timing and format coordination, signaling may be used such that a STA (STA1) can negotiate with another STAs (STA2) that operates multi-radio or multi-bands with STA1 simultaneously on the transmission rule among multi-radios or bands. That enable s STA1 to indicate to peer STA (STA2) or 3$^{rd}$ party STA to coordinate the short term/long term transmission characteristics and timing including: TXOP format, PPDU format, PHY operation modes (Power, rate, BW used RUs used), etc.

Potential advantages of some of the techniques, operations and/or methods described herein may include, but are not limited to: standardized based scheme that can be certified; no need for high cost filters—reduce dramatically the cost of the device and enable operation flexibility; collaborative operation at overlapping/alternate bands—increase dramatically the spectrum efficiency and the goodput.

In some embodiments, Collaborative Multi-Radio Multi-Band (C-MRMB) reporting and operation signaling between nodes (STAs for example) that operate on the same or overlap bands may be used.

In some embodiments, with C-MRMB Reporting signaling, STA1 can report to another STA, such as STA2, that operates multi-radio or multi-bands with STA1 simultaneously on the interference among multi-radios or bands. STA1 can indicate the interference on a radio or band, when STA1 is transmitting on a particular radio of bands. The report interference can be the maximum interference rather than the exact interference. STA2 can take the interference into count when transmit to STA1 on a particular radio or band or trigger STA1 to transmit on a particular radio or band. For each indicated interference, an interference property is provided. The interference property can be a value that represents the accuracy of the interference in the range of plus minus the value. The signaling can be part of the multi-band signaling used to negotiate radios and bands that can be operated simultaneously between STA1 and STA2. The signaling can be in an element that can be carried in management frame. The signaling can be in collocated interference report element defined in the current 802.11 spec.

In some embodiments, with C-MRMB Immediate coordination, STA1 can indicate to another STA, say STA2, that operates multi-radio or multi-bands with STA1 simultaneously on the transmission rule among multi-radios or bands. STA1 can indicate that if STA2 is receiving transmission from STA1 on a particular radio or band, then STA2 shall not transmit to STA1 on a set of radios or bands. STA1 can indicate that if STA2 is transmitting to STA1 on a particular radio or band, then STA2 shall not transmit to STA1 that triggers immediate response that overlaps with the transmission in the particular channel or band on a set of radios or bands. The restriction can be limited to only Trigger Frame defined in 11ax that triggers UL MU responses. The signaling can be part of the multi-band signaling used to negotiate radios and bands that can be operated simultaneously between STA1 and STA2. The signaling can be in an element that can be carried in management frame. STA1 can indicate to any other STA through a radio or band or channel that: reception on this radio or band or channel is not available for a specific time; trigger operation as defined in 11ax on this radio or band or channel is not available for a specific time; immediate response like Ack, BA, or control response for a transmission to STA1 on this radio or band or channel is not available for a specific time; and/or other. Note that in the above two cases, reception can still be available. The signaling can be in a new element for multi-radio multi-band transmission control. The signaling can be defined in a separate control frame. To make sure that the signaling can be transmitted faster, the signaling can go through PIFS CCA and transmit if the medium is not busy.

In some embodiments, with C-MRMB resource allocation and transmission timing and format coordination, STA1 can negotiate with another STA, say STA2, that operates multi-radio or multi-bands with STA1 simultaneously on the transmission rule for a radio or band at specific time period when a certain set of bands are operating simultaneously. The transmission rule can include any combination of the following rules and/or other rules: only transmission from STA1 to STA2 is allowed; only transmission from STA2 to STA1 is allowed; transmission from STA2 to STA1 is disallowed; transmission from STA1 to STA2 is disallowed; only one or more of specific PHY operation modes including power, rate, bandwidth or RUs for MU allocation is allowed; only a specific PPDU format is allowed; the signaling can be in an element that can be carried in management frame; and/or other.

C-MRMB flows and example C-MRMB frame formats are described. Consider simultaneous concurrent operation. A first example 1300 that uses C-MRMB reporting signaling is shown in FIG. 13. In some embodiments, this may be related to a negotiated flow, although the scope of embodiments is not limited in this respect.

Another example uses C-MRMB Resource allocation and transmission timing and format coordination. STA1 and STA2 first negotiate the transmission rule requirement at specific time, then STA1 and STA2 operates on channel 1 and channel 2 based on the agreed transmission rule at specific time. This is illustrated by 1400 in FIG. 14.

Another example uses immediate coordination flow and/or C-MRMB immediate coordination. This is illustrated by 1500 in FIG. 15. When STA1 transmits to STA2 on channel 1, STA 1 can send signaling to stop other STAs from sending to STA1. When STA1 receives transmission from STA2 on channel 1, STA 1 can send signaling to stop other STAs from triggering transmission from STA1.

An example C-MRMB frame format 1600 related to C-MRMB Reporting signaling is shown in FIG. 16. An element is used to carry the interference report. A value is provided for each band/radio i on band/radio j, where i is not equal to j, and i and j goes over all the band/radio operates simultaneously between STA1 and STA2. An interference property is provided for each reported interference value.

The interference property can be a value that represents the accuracy of the interference in the range of plus minus the value.

An example element format 1630 related to C-MRMB Immediate coordination is shown in FIG. 16. An element is used to carry the signaling. The element can be carried in a management frame. Instruction of Indication carries the instruction of transmission rule on the transmitted radio. The duration of the instruction indicates the duration when the instruction of transmission rule is valid.

An example element format 1660 related to C-MRMB Resource allocation and transmission timing and format coordination is shown in FIG. 16. An element is used to carry the signaling. The element can be carried in a management frame. Instruction of Indication carries the instruction of transmission rule on the indicated operating class and channel number. Starting time, duration, and interval identify the time period when the rule will apply as shown in the example 1700 in FIG. 17.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high efficiency (HE) access point (AP) configured for HE subchannel selective transmission (SST) operation, the apparatus comprising: memory; and processing circuitry, the processing circuitry configured to:
   set a HE SST support field of an HE capabilities element to indicate that the HE AP supports HE SST, the HE capabilities element encoded for transmission in one or more management frames; and
   negotiate a trigger-enabled target wake time (TWT) with an HE SST station (STA) (HE SST STA) to set up the HE SST operation,
   wherein to negotiate the trigger-enabled TWT, the processing circuitry is configured to encode a TWT request frame to include a TWT channel field to indicate which secondary channel is requested to contain resource unit (RU) allocations and to indicate which channel to use as a temporary primary channel during TWT service periods (TWT SPs), and
   wherein the TWT SPs are determined to avoid overlap in time with target beacon transmission times (TBTTs) during beacon frames that include delivery traffic indication maps (DTIMs).

2. The apparatus of claim 1, wherein the processing circuitry is configured to exchange frames with the HE SST STA during the TWT SPs.

3. The apparatus according to claim 2, wherein the processing circuitry is further configured to decode a channel switch timing element from the HE SST STA indicating a time that the HE SST STA takes to switch between different subchannels.

4. The apparatus according to claim 2, wherein the processing circuitry is further configured to decode a channel switch timing element from the HE SST STA, the channel switch timing element indicating a duration of time in which the HE SST STA is potentially unavailable to receive frames before start times of the TWT SPs and after end times of the TWT SPs.

5. The apparatus of claim 4, wherein the processing circuitry is configured to encode frames for transmission to the HE SST STA during the TWT SPs based on the duration of time indicated in the channel switch timing element.

6. The apparatus according to claim 4, wherein the channel switch timing element is included in a re-association request frame.

7. The apparatus according to claim 1, wherein the processing circuitry is further configured to:
   encode beacon frames for transmission on a primary channel in accordance with predetermined TBTTs,
   wherein at least some of the beacon frames include a DTIM configurable to indicate whether the HE SST AP has broadcast traffic to send.

8. The apparatus according to claim 1, wherein the processing circuitry is further configured to:
   encode beacon frames for transmission on a primary channel in accordance with predetermined TBTTs,
   wherein at least some of the beacon frames include a traffic indication map (TIM) configurable to indicate whether the HE SST AP has unicast traffic buffered for one or more HE SST STAs in power save (PS) mode.

9. The apparatus according to claim 1, wherein the processing circuitry is further configured to:
   determine the TWT SPs to enable the HE SST AP to manage activity in a basic service set (BSS) to minimize contention between HE SST STAs of the BSS and to reduce an amount of time that the HE SST STAs are to operate in an awake mode.

10. The apparatus according to claim 1, wherein:
    the processing circuitry includes a baseband processor to encode one or more beacon frames for transmission,
    the memory is configured to store the encoded TWT request frame, and
    the apparatus further comprises a transceiver to transmit the one or more beacon frames.

11. The apparatus of claim 1, wherein the processing circuitry is configured to set the HE SST support field of the HE capabilities element to one to indicate that the HE AP supports HE SST, and
    wherein to negotiate the trigger-enabled TWT, the processing circuitry is configured to encode the TWT request frame to include the TWT channel field with one bit set to indicate which secondary channel is requested to contain the RU allocations and with another bit set to indicate which channel to use as the temporary primary channel during the TWT SPs.

12. A non-transitory computer-readable storage medium that stores instructions for execution by processing circuitry of a high efficiency (HE) access point (AP) configured for HE subchannel selective transmission (SST) operation, the processing circuitry configured to:
    set a HE SST support field of an HE capabilities element to indicate that the HE AP supports HE SST, the HE capabilities element encoded for transmission of one or more management frames; and
    negotiate a trigger-enabled target wake time (TWT) with an HE SST station (STA) (HE SST STA) to set up the HE SST operation,
    wherein to negotiate the trigger-enabled TWT, the processing circuitry is configured to encode a TWT request frame to include a TWT channel field to indicate which secondary channel is requested to contain resource unit (RU) allocations and to indicate which channel to use as a temporary primary channel during TWT service periods (TWT SPs), and wherein the TWT SPs are determined to avoid overlap in time with target beacon transmission times (TBTTs) during beacon frames that include delivery traffic indication maps (DTIMs).

13. The non-transitory computer-readable storage medium of claim 12, wherein the processing circuitry is configured to exchange frames with the HE SST STA during the TWT SPs.

14. The non-transitory computer-readable storage medium according to claim 13, the processing circuitry further configured to decode a channel switch timing element from the HE SST STA indicating a time that the HE SST STA takes to switch between different subchannels.

15. The non-transitory computer-readable storage medium according to claim 13, wherein the processing circuitry is further configured to decode a channel switch timing element from the HE SST STA, the channel switch timing element indicating a duration of time in which the HE SST STA is potentially unavailable to receive frames before start times of the TWT SPs and after end times of the TWT SPs.

16. The non-transitory computer-readable storage medium of claim 15 wherein the processing circuitry is configured to encode frames for transmission to the HE SST STA during the TWT SPs based on the duration of time indicated in the channel switch timing element.

17. The non-transitory computer-readable storage medium according to claim 15, wherein the channel switch timing element is included in a re-association request frame.

18. An apparatus of a high efficiency (HE) station (STA) configured for HE subchannel selective transmission (SST) operation, the apparatus comprising: memory; and processing circuitry, the processing circuitry configured to:

decode a management frame received from an HE access point (HE AP), the management frame including a HE SST support field of an HE capabilities element set to indicate that the HE AP supports HE SST; and negotiate a trigger-enabled target wake time (TWT) with the HE AP to set up the SST operation, wherein to negotiate the trigger-enabled TWT, the processing circuitry is configured to decode a TWT request frame that includes a TWT channel field with one bit set to indicate which secondary channel is requested to contain resource unit (RU) allocations and one bit to indicate which channel to use as a temporary primary channel during TWT service periods (TWT SPs), and wherein the TWT SPs do not overlap in time with target beacon transmission times (TBTTs) during beacon frames that include delivery traffic indication maps (DTIMs).

19. The apparatus of claim 18, wherein the processing circuitry is configured to exchange frames with the HE SST AP during the TWT SPs.

20. The apparatus according to claim 19, wherein the processing circuitry is further configured to encode a channel switch timing element for transmission to the HE SST AP indicating a time that it takes the HE SST STA to switch between different subchannels.

21. The apparatus according to claim 19, wherein the processing circuitry is further configured to encode a channel switch timing element for transmission to the HE SST AP, the channel switch timing element indicating a duration of time in which the HE SST STA is potentially unavailable to receive frames before start times of the TWT SPs and after end times of the TWT SPs.

* * * * *